United States Patent
Sheng et al.

(10) Patent No.: US 11,228,964 B2
(45) Date of Patent: Jan. 18, 2022

(54) SYNCHRONIZATION SIGNAL TRANSMISSION AND RECEPTION FOR RADIO SYSTEM

(71) Applicants: Sharp Kabushiki Kaisha, Sakai (JP); FG Innovation Company Limited, Hong Kong (CN)

(72) Inventors: Jia Sheng, Vancouver, WA (US); Tatsushi Aiba, Vancouver, WA (US); Toshizo Nogami, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 238 days.

(21) Appl. No.: 15/860,406

(22) Filed: Jan. 2, 2018

(65) Prior Publication Data

US 2018/0220360 A1 Aug. 2, 2018

Related U.S. Application Data

(60) Provisional application No. 62/454,016, filed on Feb. 2, 2017.

(51) Int. Cl.
*H04L 12/28* (2006.01)
*H04W 48/10* (2009.01)
(Continued)

(52) U.S. Cl.
CPC ......... *H04W 48/10* (2013.01); *H04J 11/0073* (2013.01); *H04J 11/0076* (2013.01);
(Continued)

(58) Field of Classification Search
CPC ....................................................... H04L 12/28
(Continued)

(56) References Cited

U.S. PATENT DOCUMENTS

2010/0120442 A1   5/2010  Zhuang et al.
2011/0256868 A1  10/2011  Nogami et al.
(Continued)

OTHER PUBLICATIONS

International Search Report an Written Opinion dated Mar. 26, 2018 in PCT/US18/12059.
(Continued)

*Primary Examiner* — Dang T Ton
(74) *Attorney, Agent, or Firm* — Nixon & Vanderhye P.C.

(57) ABSTRACT

An access node comprises node processor circuitry and a node transmitter. The node processor circuitry is configured to generate plural types of synchronization signal blocks for at least partially interspersed transmission over a radio interface. Each synchronization signal block type comprises a unique combination of differing types of information. The node transmitter circuitry configured to at least partially intersperse transmission of the plural types of synchronization signal blocks over the radio interface to at least one wireless terminal. The wireless terminal comprises a terminal receiver and terminal processor circuitry. The terminal receiver is configured to receive, in at least partially interspersed manner, synchronization signal blocks of differing types over a radio interface from an access node. The terminal processor circuitry is configured determine to which of plural types of synchronization signal blocks a received synchronization signal block belongs.

8 Claims, 19 Drawing Sheets

(51) Int. Cl.
*H04W 56/00* (2009.01)
*H04L 27/26* (2006.01)
*H04J 11/00* (2006.01)
H04W 48/12 (2009.01)
H04L 5/00 (2006.01)

(52) U.S. Cl.
CPC ...... *H04L 27/2613* (2013.01); *H04L 27/2692* (2013.01); *H04W 56/001* (2013.01); *H04L 5/0053* (2013.01); *H04L 27/26* (2013.01); *H04W 48/12* (2013.01)

(58) Field of Classification Search
USPC .......................................................... 370/400
See application file for complete search history.

(56) References Cited

U.S. PATENT DOCUMENTS

| | | |
|---|---|---|
| 2015/0043541 A1 | 2/2015 | Blankenship et al. |
| 2016/0135179 A1 | 5/2016 | Yin et al. |
| 2018/0048413 A1* | 2/2018 | Liu ...................... H04J 11/0069 |

OTHER PUBLICATIONS

RP-161596, 3GPP TSG RAN Meeting #73, NTT DOCOMO, "Revision of SI: Study on New Radio Access Technology", New Orleans, Sep. 19-22, 2016.
3GPP TSG RAN WG2 #87, RAN2 Germany Chairman (Ericsson), Chairman Notes, Aug. 18 to Aug. 22, 2014, Dresden, Germany.
3GPP TSG RAN WG2 #86, RAN2 Chairman (Ericsson), Chairman Notes, May 19 to May 23, 2014, Seoul, South Korea.
R1-1610522, 3GPP TSG-RAN WG1 Meeting #86b, Intel Corporation, NTT DOCOMO, ZTE, ZTE Microelectronics, ETRI, InterDigital, "WF on the unified structure of DL sync signal", Lisbon, Portugal, Oct. 10-14, 2016.
R1-1611268, 3GPP TSG RAN WG1 #87, ZTE, ZTE Microelectronics, "Considerations on SS block design", Reno, USA, Nov. 14-18, 2016.
RP-151109, 3GPP TSG RAN Meeting #68, LG Electronics, CATT, Vodafone, Huawei, "New SI proposal: Feasibility Study on LTE-based VA2X Services", Malmo, Sweden, Jun. 15-18, 2015.
RP-152293, LG Electronics, Huawei, HiSilicon, CATT, CATR, "New WI proposal: Support for V2V services based on LTE sidelink", Sitges, Spain, Dec. 7-10, 2015.
R1-160575, EGPP TSG RAN WG1 #84, Samsung, "Resource Pool for V2V", St. Julian's, Malta, Feb. 15-19, 2016.
R1-160366, 3GPP TST RAN WG1 #84, CATT, "Considerations on V2V traffic priority and relative resource allocation", St Julian's, Malta, Feb. 15-19, 2016.
R1-160636, 3GPP TST RAN WG1 #84, LG Electronics, "Discussion on resource pool structure for PC5-based V2V", St. Julian's, Malta, Feb. 15-19, 2016.
R1-160678, 3GPP TST RAN WG1 #84, Sony, "Location based resource selection on LTE sidelink for V2V services", St. Julian's, Malta, Feb. 15-19, 2016.
R1-160679, 3GPP TST RAN WG1 #84, Sony, "Resource pool configurations on LTE sidelink for V2V services", St. Julian's, Malta, Feb. 15-19, 2016.
R1-160682, 3GPP TST RAN WG1 #84, ZTE, "Resource pool allocation for V2V", 2016 St. Julian's, Malta, Feb. 15-19, 2016.
RP160689, 3GPP TST RAN WG1 #84, ZTE, "Discussion on resource allocation and procedure for V2V", St. Julian's, Malta, Feb. 15-19, 2016
R1-160895, 3GPP TST RAN WG1 #84, Qualcomm Incorporated, "Resource Pool Design for V2V", St. Julian's, Malta, Feb. 15-19, 2016.
R1-160909, 3GPP TST RAN WG1 #84, Nokia Networks, Alcatel Lucent, Alcatel Lucent Shanghai Bekk, "On resource control/selection mechanisms for V2V operation", St Julian's, Malta, Feb. 15-19, 2016.
R1-161031, 3GPP TST RAN WG1 #84, General Motors, "Geo Based Resource Scheduling for V2V Communications", St Julian's, Malta, Feb. 15-16, 2016.
R1-160360, 3GPP TST RAN WG1 #84, CATT, "Synchronization enhancements in PCS-based V2V", St. Julian'S, Malta, Feb. 15-19, 2016.
R1-160307, 3GPP TST RAN WG1 #84, Huawei, HiSilicon, "UE autonomous resource selection", St. Julian's, Malta, Feb. 15-19, 2016.
R1-160431, 3GPP TST RAN WG1 #84, Intel Corporation, "Support of geo-based transmission schemes for V2V communication", St. Julian's, Malta, Feb. 15-19, 2016.
R1-161075, 3GPP TST RAN WG1 #84, Ericsson, "Discussion on V2X PC5 Scheduling, Resource Pools and Resource Patterns", St. Julian's, Malta, Feb. 15-19, 2016.
3GPP TR 22.885 VI.0.0, Techmeal Specification, 3rd Generation Partnership Project; Techmeal Specification Group Services and System Aspects; Study on LTE Support for V2X Services (Release 14) (Sep. 2015).
3GPP TR 22.885 V14.0.0, Techmeal Specification, 3rd Generation Partnership Project; Techmeal Specification Group Services and System Aspects; Study on LTE Support for V2X Services (Release 14) (Dec. 2015).
3GPP TS 36.331 V13.0.0, Technical Specification, 3rd Generation Partnership Project; Technical Specification Group Radio Access Network; Evolved Universal Terrestrial Radio Access (E-UTRA); Radio Resource Control (RRC); Protocol specification (Release 13) (Dec. 2015).
Sesia et al., "LTE—The UMTS Long Term Evolution: From Theory to Practice", Second Edition, © 2011 John Wiley & Sons Ltd.
R1-1612721, 3GPP TSG RAN WG1 Meeting #87, NTT DOCOMO, Inc., "Discussion and evaluation on NR-PSS/SSS design", Reno, USA, Nov. 14-18, 2016.
RAN1 Chairman's Notes, 3GPP TSG RAN WG1 Meeting #85, Nanjing, China, May 23-27, 2016.
3GPP TS 36.211 V13.2.0, Technical Specification, $3^{rd}$ Generation Partnership Project; Technical Specification Group Radio Access Network; Evolved Universal Terrestrial Radio Access (E-UTRA); Physical channels and modulation (Release 13) (Jun. 2016).
3GPP TSG RAN WG1 Meeting NR Ad-Hoc, RAN1 Chairman's Notes, Spokane, USA, Jan. 16-20, 2017.
3GPP TSG RAN WG1 Meeting #86bis, RAN1 Chairman's Notes, Lisbon, Portugal, Oct. 10-14, 2016.
R1-1700884, 3GPP TSG RAN WG1 NR AH, Samsung, "SS BW and multiplexing", Spokane, USA, Jan. 16-20, 2017.

* cited by examiner

SYNCHRONIZATION SIGNAL TRANSMISSION AND RECEPTION FOR RADIO SYSTEM

This application claims the priority and benefit of U.S. Provisional Patent Application 62/454,016, filed Feb. 2, 2017, entitled SYNCHRONIZATION SIGNAL TRANSMISSION AND RECEPTION FOR RADIO SYSTEM, which is incorporated herein by reference in its entirety.

TECHNICAL FIELD

The technology relates to wireless communications, and particularly to methods and apparatus for transmitting and receiving system information (SI) in wireless communications.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

Work has started in the International Telecommunications Union (ITU) and 3GPP to develop requirements and specifications for new radio (NR) 5G systems, e.g., fifth generation systems. Within the scope of 3GPP, a new study item (SID) "Study on New Radio Access Technology" has been approved. The timeline and the study situations of NR development are summarized in RP-161596, "Revision of SI: Study on New Radio Access Technology", 3GPP TSG RAN Meeting #73, New Orleans, Sep. 19-22, 2016, which is incorporated herein by reference. In order to fulfill 5G requirements, changes with regard to 4G LTE system have been proposed for study, such as higher frequency spectrum usage (e.g., 6 GHz, 40 GHz or up to 100 GHz), scalable numerology (e.g., different subcarrier spacing (SCS), 3.75 KHz, 7.5 KHz, 15 KHz (current LTE), 30 KHz . . . possibly 480 KHz), beam based initial access (one traditional cell may contain multiple beams due to the particular beamforming adopted).

Here, three PSS sequences provide identification of cell ID (0-2); and SSS sequences provide identification of cell ID group (0-167). Therefore, in all 168*3=504 PCI IDs are supported in the system. In a RAN1 #87 meeting, it was pointed out that "Number of IDs provided by NR-PSS/SSS" should be studied. See, e.g., 3GPP RAN1 #87 Chairman's Notes, which is incorporated herein by reference. Further, in RAN1 #86 meeting, it was agreed that "Detection of NR cell and its ID. See, e.g., 3GPP RAN1 #86 Chairman's Notes, which is incorporated herein by reference.

It is anticipated that in the next generation new radio (NR) technology, a cell corresponds one or multiple transmission and reception point (TRPs). This means multiple TRPs can share the same NR cell ID, or each transmission and reception point (TRP) may have its own identifier. Further, the transmission of one TRP can be in the form of single beam or multiple beams. Each of the beams may also possibly have its own identifier. FIG. 2 provides a simple example depiction of a relationship between cell, transmission and reception point (TRP), and beam.

It has been agreed in RAN1 #86bis meeting (See, e.g., 3GPP RAN1 #86bis Chairman's Notes, which is incorporated herein by reference) that:

- PSS, SSS and/or PBCH can be transmitted within a 'SS block'
  - Multiplexing other signals are not precluded within a 'SS block'
- One or multiple 'SS block(s)' compose an 'SS burst'
- One or multiple 'SS burst(s)' compose a 'SS burst set'
  - The Number of SS bursts within a SS burst set is finite.
- From RAN1 specification perspective, NR air interface defines at least one periodicity of SS burst set (Note: Interval of SS burst can be the same as interval of SS burst set in some cases, e.g., single beam operation)

FIG. 3 is an example NR SS block structure according to the RAN1 #86bis meeting. In FIG. 3, "synchronization signal bursts series" represents a "SS burst set". Additional detailed examples are illustrated in R1-1610522, "WF on the unified structure of DL sync signal", Intel Corporation, NTT DOCOMO, ZTE, ZTE Microelectronics, ETRI, InterDigital, Lisbon, Portugal, 10-14 Oct. 2016, which is incorporated herein by reference. According to R1-1611268, "Considerations on SS block design", ZTE, ZTE Microelectronics, Reno, USA, November 2016, 14-18, 2016, which is incorporated herein by reference, the structure of the SS block of FIG. 3 may be as shown in FIG. 4.

Likely a synchronization signal block will have a fixed multiplexing structure, which means once the information/signal is decided, each will have fixed time or/and frequency position(s) in the SS block. Here PSS/SSS and PBCH have different periodicity due to different detection performance requirements and different methods to combat channel distortion The technology disclosed herein concerns design methods for NR synchronization, e.g., different types of fixed multiplexing structure SS blocks, as well as new structures and operations for access node and wireless terminal utilizing such new synchronization signal block structures.

In one of its aspects the technology disclosed herein concerns a user equipment which comprises receiving circuitry. The receiving circuitry is configured to receive, from a base station apparatus, a radio resource control signaling including information, the information being used for indicating whether a primary synchronization signal and a secondary synchronization signal and a physical broadcast channel and a reference signal for decoding the physical broadcast channel are transmitted in a block consisting of a constant number of OFDM symbols. The receiving circuitry is further configured to receive, based on the information, from the base station apparatus, the block in which the primary synchronization signal and the secondary synchronization signal and the physical broadcast channel and the reference signal for decoding the physical broadcast channel are transmitted. The primary synchronization signal and the secondary synchronization signal are used for identifying a physical cell identity, and the physical broadcast channel is used for carrying System Frame Number information.

In another of its aspects the technology disclosed herein concerns a method in a user equipment. In a basic mode the method comprises receiving, from a base station apparatus, a radio resource control signaling including information, the information being used for indicating whether a primary synchronization signal and a secondary synchronization signal and a physical broadcast channel and a reference signal for decoding the physical broadcast channel are transmitted in a block consisting of a constant number of OFDM symbols. The method further comprises receiving, based on the information, from the base station apparatus, the block in which the primary synchronization signal and the secondary synchronization signal and the physical broadcast channel and the reference signal for decoding the physical broadcast channel are transmitted. The primary synchronization signal and the secondary synchronization signal are used for identifying a physical cell identity. The physical broadcast channel is used for carrying System Frame Number information.

In another of its example aspects the technology disclosed herein concerns a base station apparatus comprising transmitting circuitry. The transmitting circuitry is configured to transmit, to a user equipment, a radio resource control signaling including information, the information being used for indicating whether a primary synchronization signal and a secondary synchronization signal and a physical broadcast channel and a reference signal for decoding the physical broadcast channel are mapped to a block consisting of a constant number of OFDM symbols. The transmitting circuitry is further configured to transmit, based on the information, to the user equipment, the block to which the primary synchronization signal and the secondary synchronization signal and the physical broadcast channel and the reference signal for decoding the physical broadcast channel are mapped. The primary synchronization signal and the secondary synchronization signal are used for identifying a physical cell identity. The physical broadcast channel is used for carrying System Frame Number information.

In another of its example aspects the technology disclosed herein concerns a method in the base station. In a basic example embodiment and mode the method comprises transmitting, to a user equipment, a radio resource control signaling including information, the information being used for indicating whether a primary synchronization signal and a secondary synchronization signal and a physical broadcast channel and a reference signal for decoding the physical broadcast channel are mapped to a block consisting of a constant number of OFDM symbols. The method further comprises transmitting, based on the information, to the user equipment, the block to which the primary synchronization signal and the secondary synchronization signal and the physical broadcast channel and the reference signal for decoding the physical broadcast channel are mapped. The primary synchronization signal and the secondary synchronization signal are used for identifying a physical cell identity. The physical broadcast channel is used for carrying System Frame Number information.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
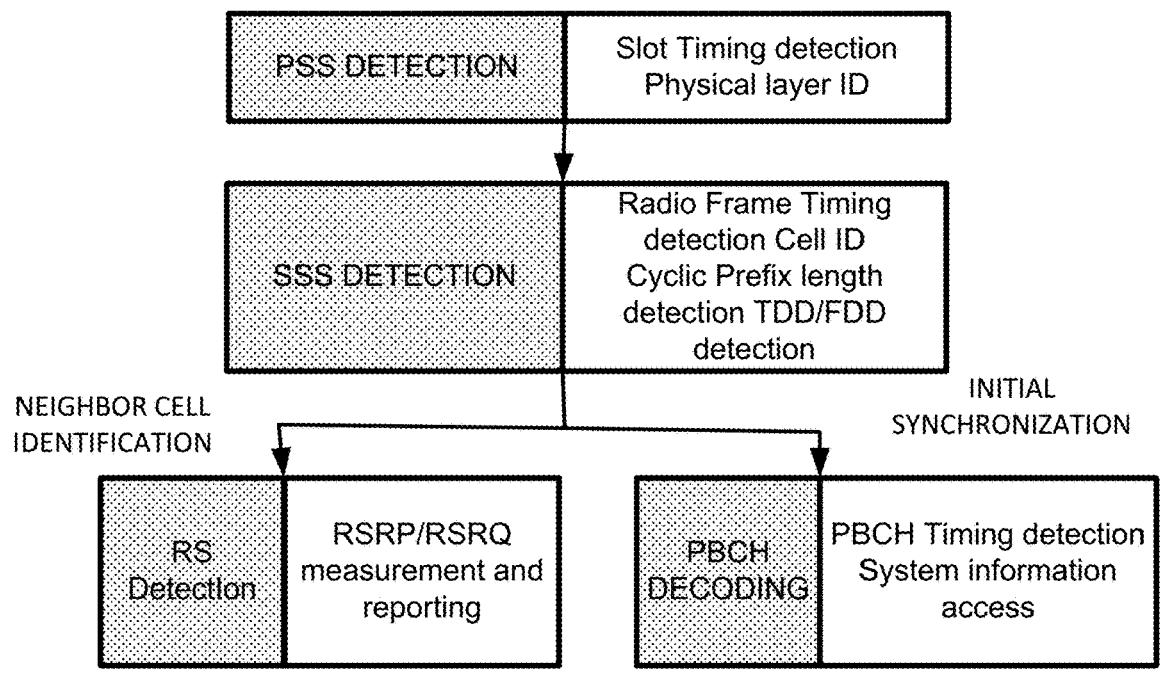
FIG. 1 is a diagrammatic view showing information utilized in an initial access procedure.
Figure 2:
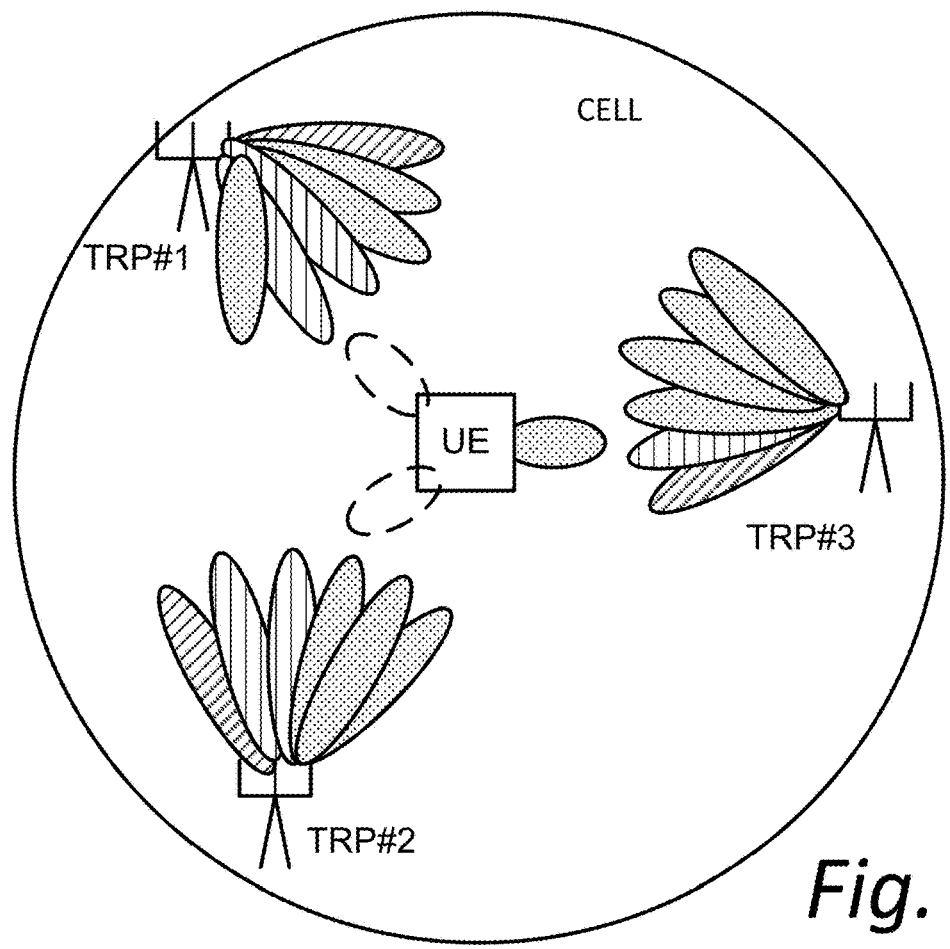
FIG. 2 is a diagrammatic view showing an example relationship between cell, transmission and reception point (TRP), and beam

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, tablets, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of an access node may include, in the 3GPP specification, a Node B ("NB"), an enhanced Node B ("eNB"), a home eNB ("HeNB"), or in the 5G terminology, a gNB or even a transmission and reception point (TRP), or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, . . . ), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

Here, hierarchical synchronization signals, i.e., primary synchronization sequences (PSS) and secondary synchronization sequences (SSS) provide coarse time/frequency synchronization, physical layer cell ID (PCI) identification, subframe timing identification, frame structure type (FDD or TDD) differentiation and cyclic prefix (CP) overhead identification. On the other hand, in such systems, a physical broadcast channel (PBCH) provides further information, such as system frame number (SFN) and essential system information so that a wireless terminal (e., UE) can obtain information to access the network. An initial access procedure for such system is illustrated in FIG. 1.

Three PSS sequences provide identification of cell ID (0-2); and SSS sequences provide identification of cell ID group (0-167). Therefore, in all 168*3=504 PCI IDs are supported in the system.

As stated in U.S. provisional patent application 62/443,622, filed Jan. 6, 2017, incorporated herein by reference in its entirety, a PBCH may be skipped in a SS block, and in such case the resources originally used for PBCH in the fixed multiplexing structure can be used for other purposes, e.g., used for SS repetition to enhance SS detection performance. In some of its example aspects, the technology disclosed herein specifies how a wireless terminal may know which SS block has what kind of information skipped in the fixed multiplexing structure, and how the wireless terminal may know its corresponding behavior in such situation.

Figure 5A:
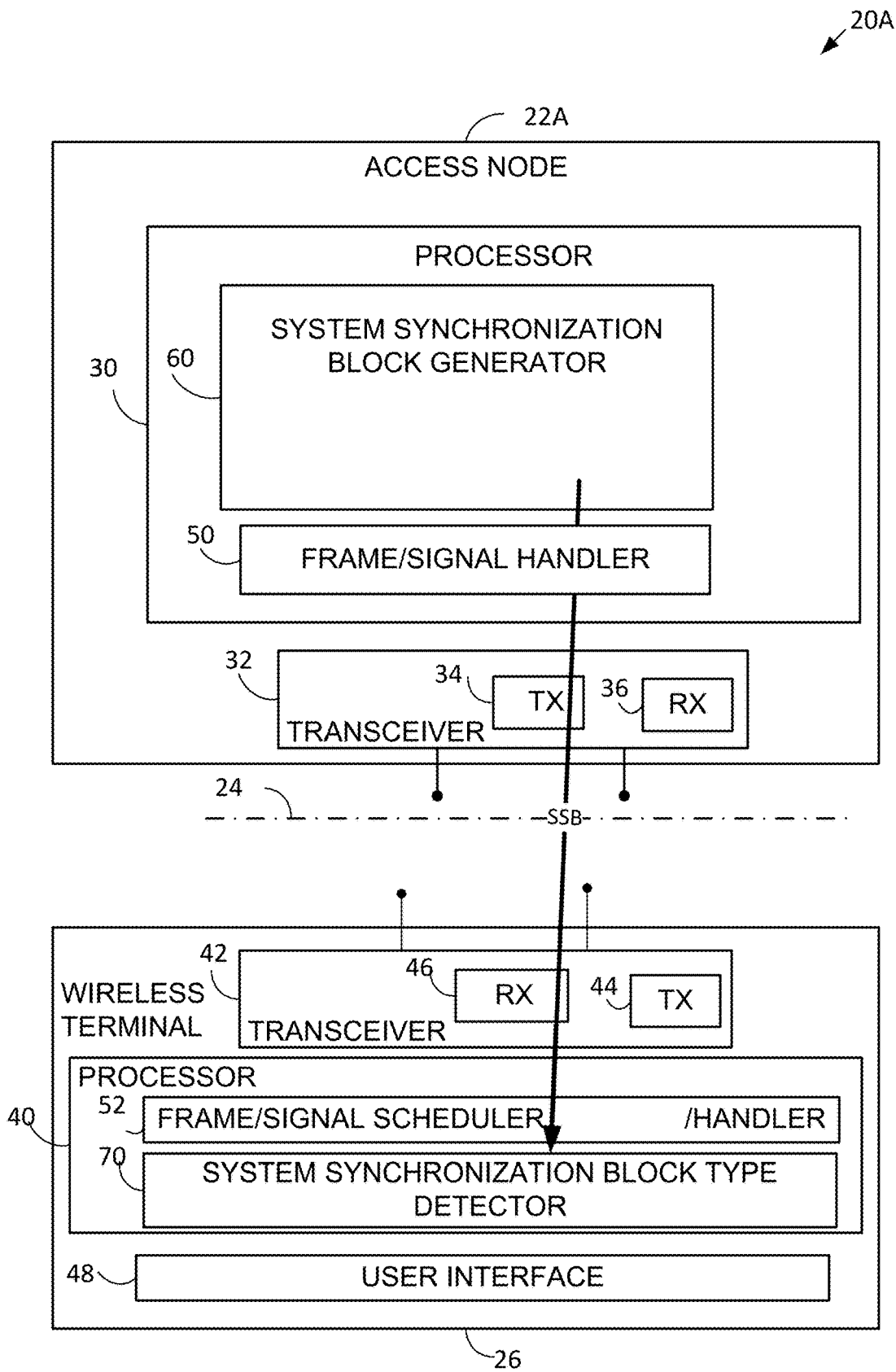
FIG. 5A-FIG. 5H are schematic views showing an example communications system comprising synchronization signal block generators that generate differing types of synchronization signal blocks for interspersed transmission over a radio interface to a wireless terminal.

FIG. 5A shows an example communications system 20A wherein radio access node 22A communicates over air or radio interface 24 (e.g., Uu interface) with wireless terminal 26. As mentioned above, the radio access node 22A may be any suitable node for communicating with the wireless terminal 26, such as a base station node, or eNodeB ("eNB") or gNodeB or gNB, for example. The node 22A comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22A and radio interface 24, the respective transceiver circuitries 22 include antenna(s). The respective transmitter circuits 34 and 44 may comprise, e.g., amplifier(s), modulation circuitry and other conventional transmission equipment. The respective receiver circuits 36 and 46 may comprise, e.g., e.g., amplifiers, demodulation circuitry, and other conventional receiver equipment.

In general operation node, access node 22A and wireless terminal 26 communicate with each other across radio interface 24 using predefined configurations of information. By way of non-limiting example, the radio access node 22A and wireless terminal 26 may communicate over radio interface 24 using "frames" of information that may be configured to include various channels. In Long Term Evolution (LTE), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, or symbol, slot, mini-slot in 5G for example).

To cater to the transmission of information between radio access node 22A and wireless terminal 26 over radio interface 24, the node processor 30 and terminal processor 40 of FIG. 1 are shown as comprising respective information handlers. For an example implementation in which the information is communicated via frames, the information handler for radio access node 22A is shown as node frame/signal scheduler/handler 50, while the information handler for wireless terminal 26 is shown as terminal frame/signal handler 52.

In the technology disclosed herein access node 22A comprises synchronization signal block generator 60. The synchronization signal block generator 60, which may be realized by node processor 30, serves to generate plural types of synchronization signal blocks for at least partially interspersed transmission over the radio interface 24. Each type of synchronization signal block comprises a unique combination of types of information, as described herein. The transmitter circuitry 34 transmits the synchronization signal blocks generated by synchronization signal block generator 60 in at least partially interspersed manner over the radio interface 24. As such, the wireless terminal 26 does not receive a constant stream of synchronization signal blocks all of the same type, but from time to time receives one or more synchronization signal blocks of differing type in a series of synchronization signal block transmissions.

Figure 6:
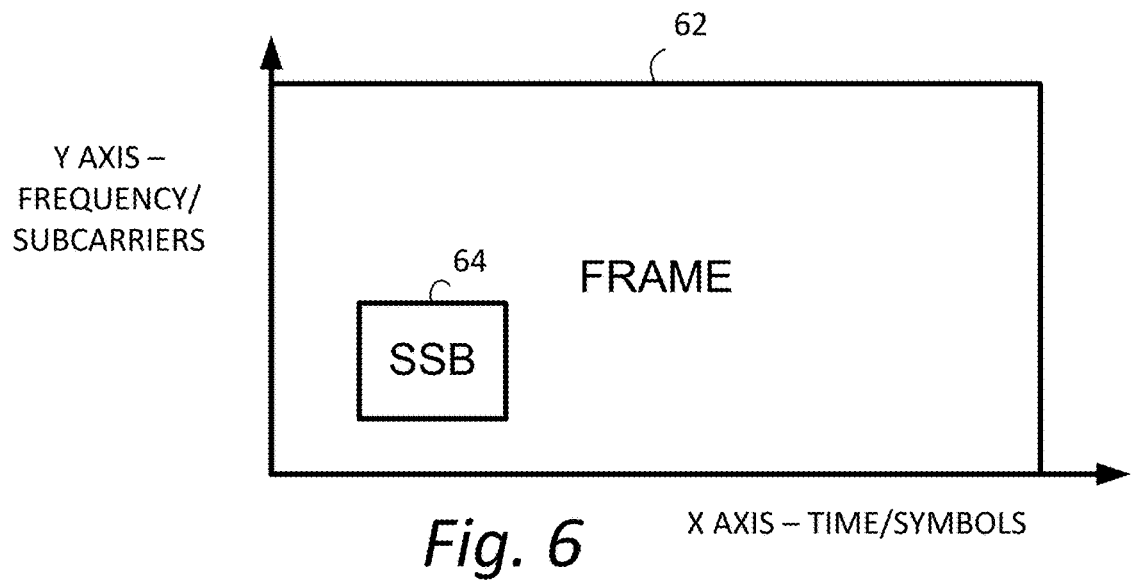
FIG. 6 is a diagrammatic view of a basic frame structure showing inclusion of an example synchronization signal block.

The synchronization signal blocks may be carried in a frame structure that may be realized as an array or grid of time and frequency (carrier/subcarrier) resources. For example, FIG. 6 illustrates a basic transmission frame 62 in which time resources are depicted along an X axis and frequency (e.g., subcarriers) are arranged along a Y axis. An example synchronization signal block 64 is depicted as being included in the frame 62. There may be different subcarrier spacing in different systems depending on how the frame is constructed. For a given subcarrier spacing, preferably all synchronization signal blocks have a same size in terms of a same number of resources that comprise the synchronization signal block. Such same number of resources may be referred to as the "reference design" of the synchronization signal block. For example, an integer N number of OFDM symbols may comprise the synchronization signal blocks for a given subcarrier spacing. For example, for a given frequency band, the (a) synchronization signal block may correspond to N symbols (e.g., OFDM symbols). Here, the number of N may be a constant. Also, for a given frequency band, a (the) synchronization signal block may correspond to N symbols based on a default subcarrier spacing. For example, the default subcarrier spacing may be defined for a given frequency band, in advance, by the specifications. For example, the default subcarrier spacing may be 15 kHz. While preferably the number of resources utilized for a synchronization signal block is fixed, the relative "dimensions" of the synchronization signal block along the time and frequency axes of the grid may vary according to differing implementations of the reference design.

Figure 4:
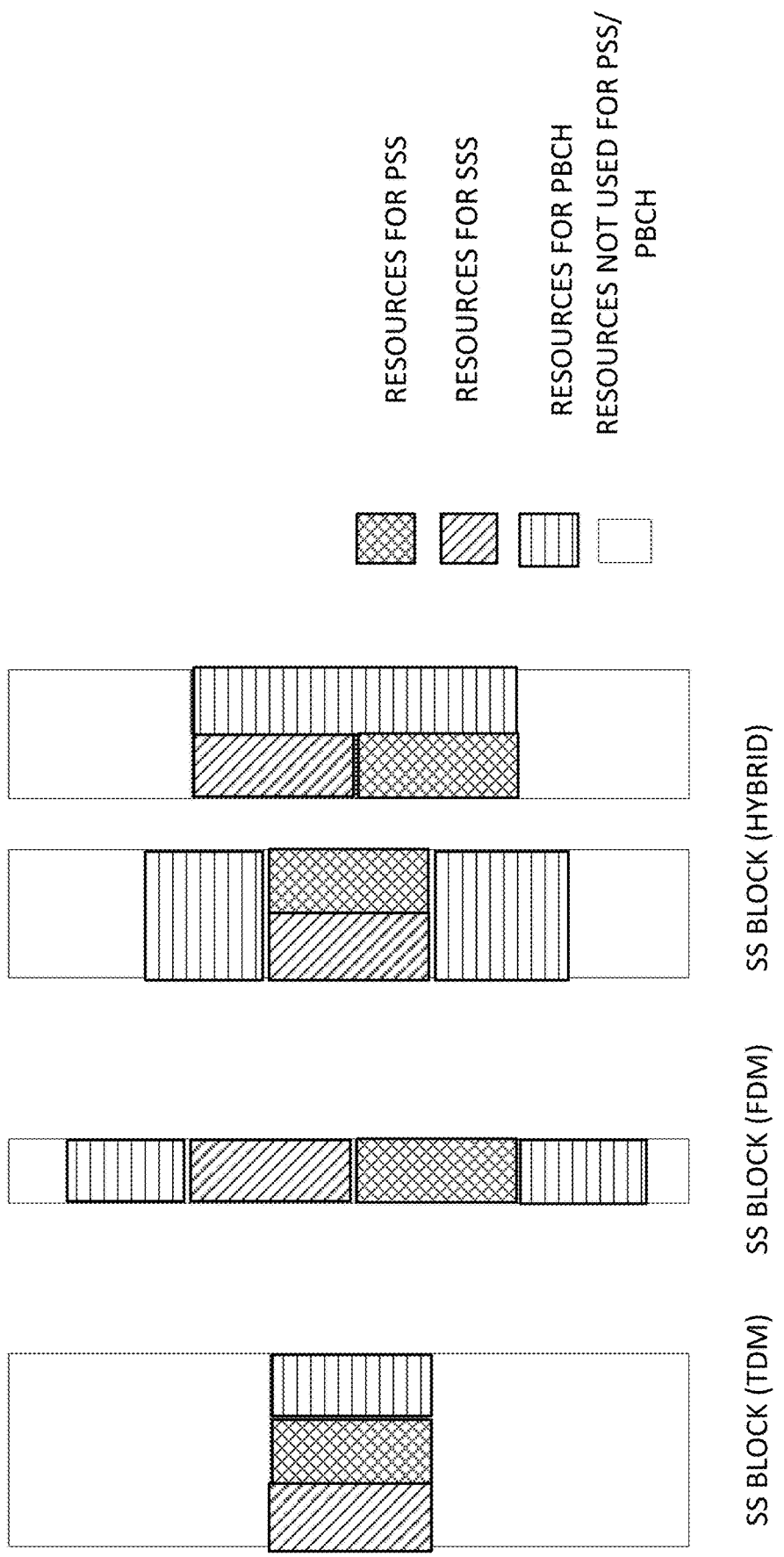
FIG. 4 is a diagrammatic view showing example structure of the SS block of FIG. 3.

In the above regard, it should be appreciated from FIG. 4 that content of a synchronization signal block may be constructed or multiplexed either in a time division manner, a frequency division manner, or using a hybrid of time division and frequency division. For example, in the time divisional (TDM) illustration of FIG. 4 symbols 0-2 may be allocated to a primary synchronization signal (PSS), symbols 3-5 may be allocated to secondary synchronization signal (SSS), and symbols 6-9 may be allocated to a Physical Broadcast Channel (PBCH). Namely, the synchronization signal block(s) may comprise of one or more symbols corresponding to the signal(s) and/or the channel(s).

As indicated above, the synchronization signal block generator 60 generates plural types of synchronization signal blocks, and each type of synchronization signal block comprises a unique combination of types of information, as described herein. The types of information that may be included in a synchronization signal block may comprise:

synchronization signals (primary synchronization signals (PSS), secondary synchronization signals (SSS), and/or tertiary synchronization signals (TSS))

one or more physical broadcast channels (PBCH)

first reference signals (e.g., the first reference signal(s) used for a measurement)

second reference signals (e.g., the second reference signal(s) for PBCH decoding)

signaling (DCI: Downlink Control Information) carried by Physical Downlink Control Channel (PDCCH)

data carried by Physical Downlink Shared Channel (PDSCH)

data carried by Physical Random Access Channel (PRACH)

paging information

The multiplexing structure of the synchronization signal block(s) may be fixed. For example, the fixed multiplexing structure of the synchronization signal block(s) may be defined, in advance, by a specification. For example, the multiplexing (e.g., the PSS (may be mapped to symbols 0-2), the SSS (may be mapped to symbols 3-5), the TSS (may be mapped to symbols 6-7), the PBCH (may be mapped to symbols 8-10), the first reference signals (may be mapped to symbols 11), the second reference signals (may be mapped to 8-10), the signaling carried by the PDCCH (may be mapped to 12-13), and/or the data carried by the PDSCH) of the synchronization signal block(s) may be defined as the fixed multiplexing structure. Moreover, one or more types of the synchronization signal block(s) may be defined based on the fixed multiplexing structure. For example, one or more information defined as the fixed multiplexing structure may be not transmitted (e.g., not mapped, skipped). For example, the PBCH may be not transmitted, in a certain timing, in the synchronization signal block(s). Also, the PBCH and the second reference signal may be not transmitted, in a certain timing, in the synchronization signal block(s). For example, only the PSS and the SSS may be transmitted, in a certain timing, in the synchronization signal block(s). Also, only the PSS and the SSS and the PBCH may be transmitted, in a certain timing, in the synchronization signal block(s). The details of different types of the synchronization block(s) may be described below.

In the above regard, the tertiary synchronization signals (TSS) are synchronization signals which are provided by the access node in addition to the primary synchronization signal (PSS) and secondary synchronization signal (SSS). Moreover, as noted above, it is possible also to have plural Physical Broadcast Channels, e.g., PBCH1 and PBCH2.

Table 1 below shows the differing types of the synchronization signal block(s) that may be generated by synchronization signal block generator 60, and particularly shows by the ♦ symbol the unique combination of types of information that may be included in each synchronization signal block. As described above, the unique combination of types of information (also, the ♦ symbol) may be defined, in advance, by a specification. The number of types of synchronization signal blocks, and the information types, of Table 1 are not exhaustive, but are only for sake of simplified example.

TABLE 1

| SSB Type | PSS | SSS | TSS | PBCH1 | PBCH2 |
|---|---|---|---|---|---|
| 1 | ♦ | ♦ | ♦ | ♦ | ♦ |
| 2 | ♦ | ♦ | ♦ | ♦ | |
| 3 | ♦ | ♦ | ♦ | | ♦ |
| 4 | ♦ | ♦ | ♦ | | |
| 5 | ♦ | ♦ | | | |

Figure 7A:
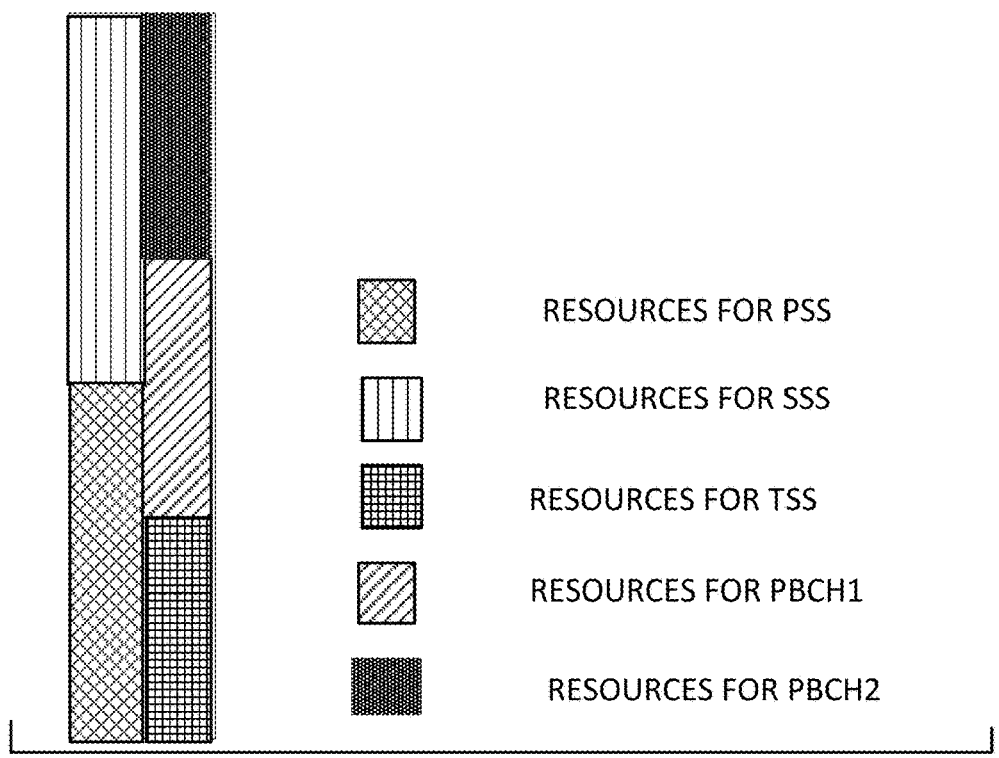
FIG. 7A and FIG. 7B are diagrammatic views of synchronization signal blocks according to two differing synchronization signal block types.
Figure 7B:
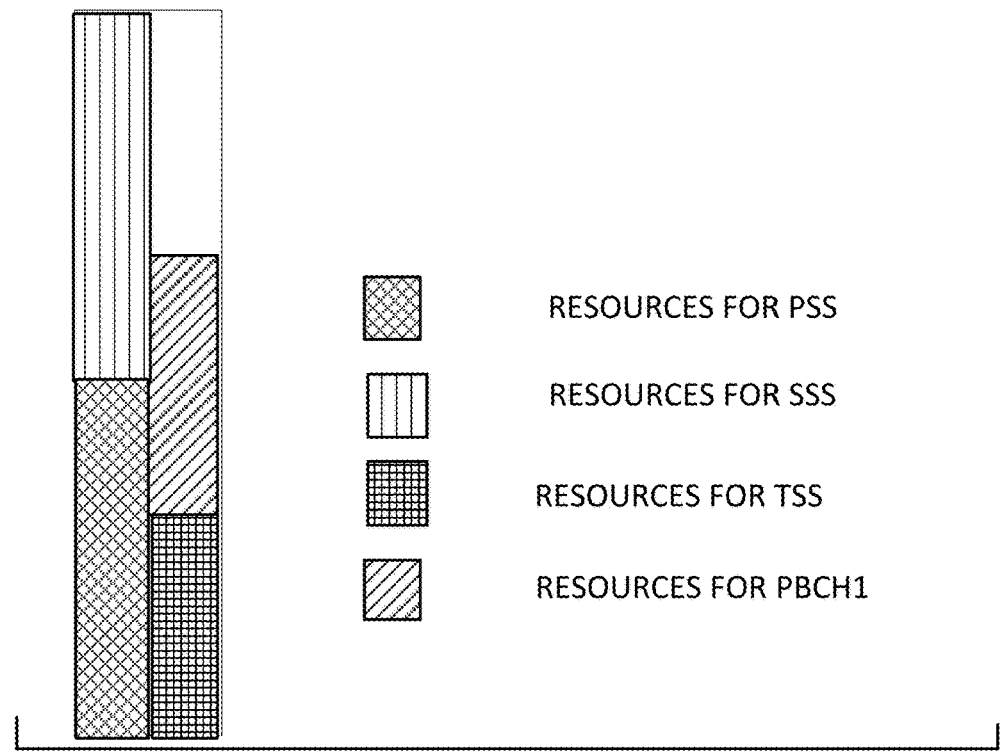

Thus, as shown in Table 1, SSB type 1 (i.e., a type 1 of SSB) includes five types of information: PSS, SSS, TSS, PBCH1, and PBCH2. FIG. 7A also illustrates SSB type 1, and shows that the entire resource allocation for the synchronization signal block of SSB type 1 is utilized for a combination of PSS, SSS, TSS, PBCH1, and PBCH2. By contrast FIG. 7B shows that the synchronization signal block of SSB type 2 (i.e., a type 2 of SSB), while being of the same size as the synchronization signal block of SSB type 1, includes content for only PSS, SSS, TSS, and PBCH1. As explained herein, from the perspective of the synchronization signal block type 1, a field of the synchronization signal block of FIG. 7B is skipped or nonconforming with respect to PBCH2.

Figure 8:
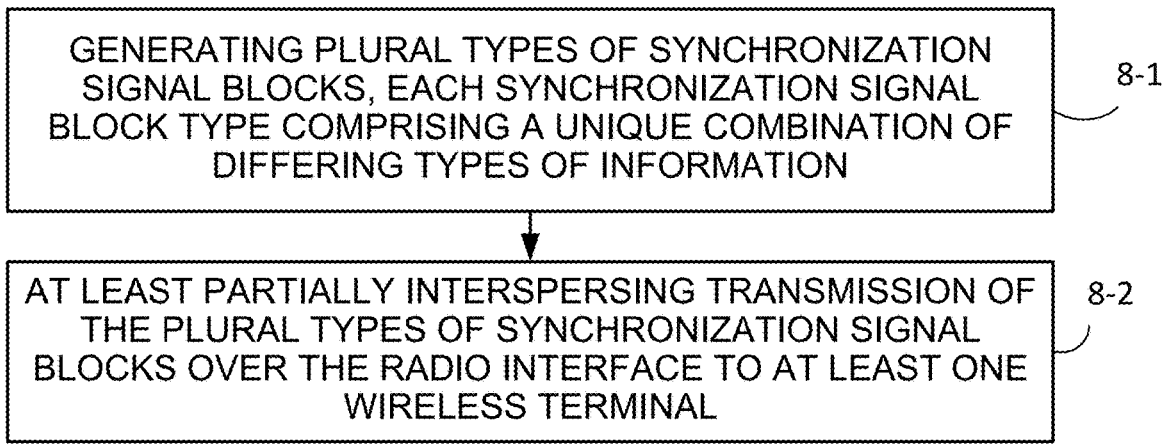
FIG. 8 is a flowchart showing example basic acts or steps performed by the access node of FIG. 5A.

FIG. 8 shows example basic acts or steps that may be performed by the access node 22A of FIG. 5A. Act 8-1 comprises the access node using processor circuitry generating plural types of synchronization signal blocks for at least partially interspersed transmission over a radio interface, each type of the synchronization signal block comprising a unique combination of differing types of information. For example, the synchronization signal block generator 60 of FIG. 5A may generate both synchronization signal blocks of SSB type 1 of FIG. 7A and synchronization signal blocks of SSB type 2 of FIG. 7B. Act 8-2 comprises the node transmitter circuitry 34 at least partially interspersing transmission of the plural types of synchronization signal blocks over the radio interface to at least one wireless terminal.

The wireless terminal 26 of FIG. 5A comprises terminal receiver circuitry 46 and terminal processor 40. The terminal receiver circuitry 46 receives, in at least partially interspersed manner, synchronization signal blocks of differing types over the radio interface from an access node. As explained above, each synchronization signal block type comprises a unique combination of differing types of information. The terminal processor 40 comprises synchronization signal block type detector 70, which is configured determine to which of plural types of synchronization signal blocks a received synchronization signal block belongs.

Figure 9:
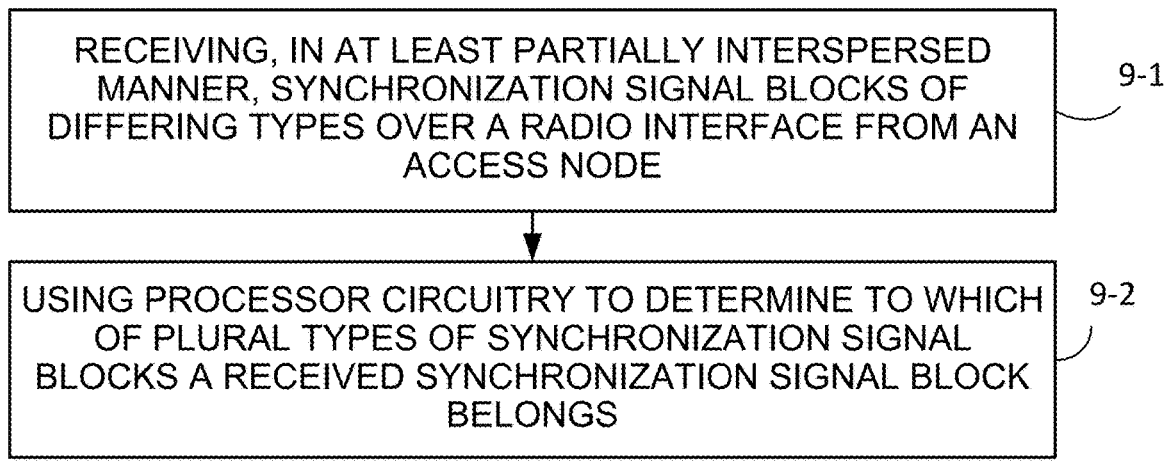
FIG. 9 is a flowchart showing example basic acts or steps performed by the access node of FIG. 5A.

FIG. 9 thus shows example basic acts or steps that may be performed by the wireless terminal 26 of FIG. 5A. Act 9-1 receiving, in at least partially interspersed manner, synchronization signal blocks of differing types over a radio interface from an access node. Act 9-2 comprises the wireless terminal 26 using processor circuitry, e.g., synchronization signal block type detector 70, to determine to which of plural types of synchronization signal blocks a received synchronization signal block belongs.

It should be noted that, for a given carrier frequency band, the synchronization signal blocks of all types have the same size (e.g., same number of frame resources), and are essentially formatted or configured so that, from synchronization signal block type to synchronization signal block type, the same resources are similarly partitioned. For example, in size of the fields comprising the synchronization signal blocks of FIG. 7A and FIG. 7B are of the same size and are similarly situated within the synchronization signal block.

Figure 5B:
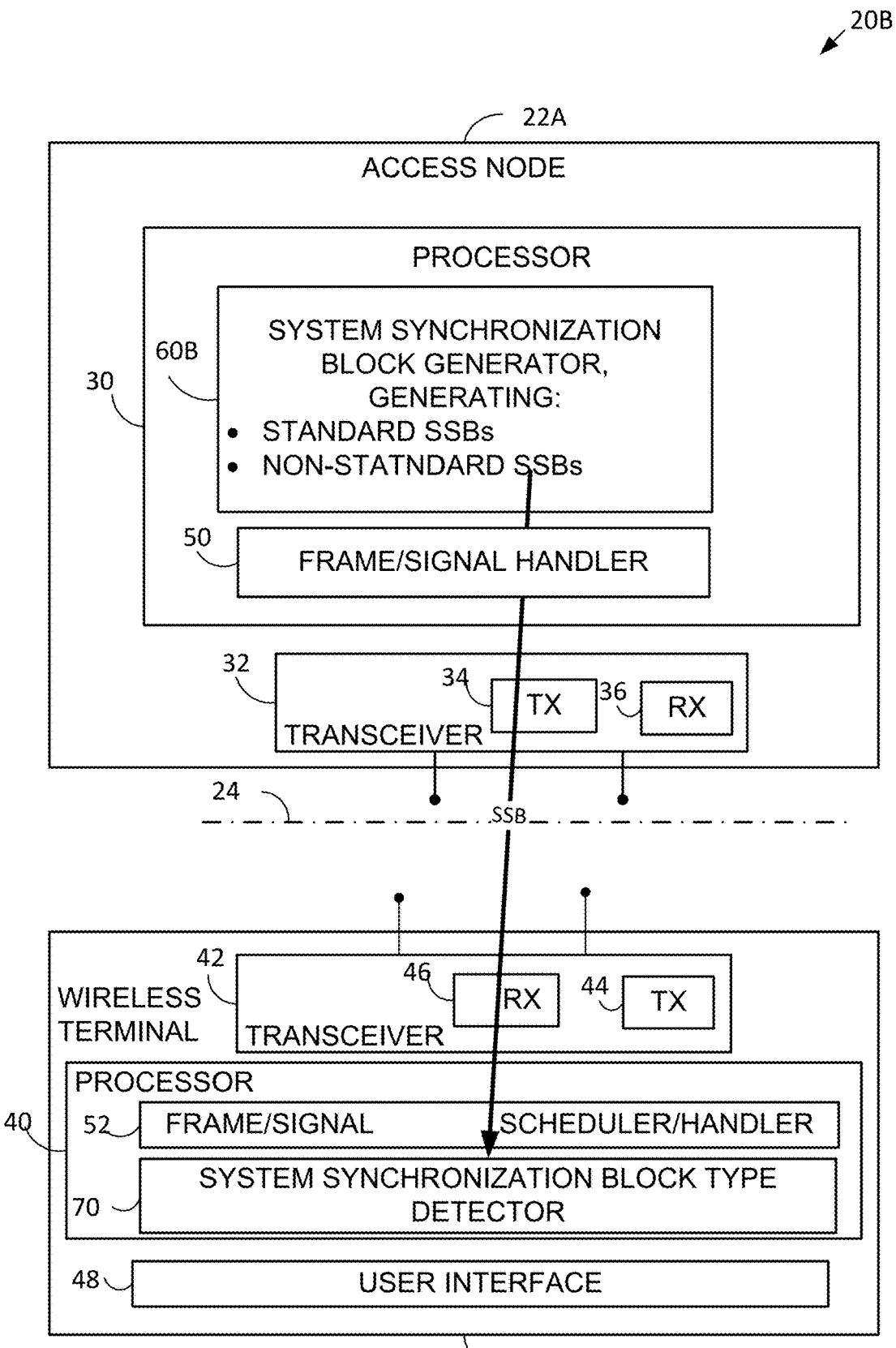

FIG. 5B illustrates an embodiment and mode of access node 22B in which the synchronization signal block generator 60B designates a first type of synchronization signal block as a "standard" synchronization signal block, and other types of synchronization signal blocks (e.g., a second type of synchronization signal block, and/or a third type of synchronization signal block) as "non-standard" synchronization signal blocks. Thus the synchronization signal block generator 60B of FIG. 5B is shown as generating both standard and non-standard synchronization signal block types. Preferably the first or standard type of synchronization signal block contains information for a fixed number of different types of information and is considered a "full" or "complete" synchronization signal block (such as the synchronization signal block of FIG. 7A). Namely, the first or standard type of synchronization signal block may contain full information (i.e., all information) defined as the fixed multiplexing structure. However, from the perspective of the type of the standard synchronization signal block, a non-standard type of synchronization signal block contains information only for a subset of the types of information included in the standard synchronization signal block, as described above. For example, the synchronization signal block of FIG. 7B includes only information for PSS, SSS, TSS, and PBCH (e.g., PBCH1) (but does not contain information for PBCH2, i.e., but does not contain other information included in the type of the standard synchronization signal block).

Thus, from synchronization signal block type to synchronization signal block type, for a non-standard synchronization signal block essentially the same resources (e.g., time resources and/or frequency resources) are partitioned or allocated for the same types of information as in the standard synchronization signal block, but only a subset of those resource allocations are used in the manner of the standard synchronization signal block. The resources location allocations or partitions are herein referred to as fields (or symbols (e.g., OFDM symbols)). That is, in the standard synchronization signal block of FIG. 7A there is a PSS field, a SSS field, a TSS field, a PBCH1 field, and a PBCH2 field. The non-standard synchronization signal block of FIG. 7B has the same fields, but the PBCH2 field is not filled with PBCH2 information.

The synchronization signal block generator 60B of FIG. 5B generates a standard synchronization signal block which comprises a predetermined number of fields which respectively correspond to a predetermined number of different types of information. For example, as described above, a predetermined number of fields which respectively correspond to a predetermined number of different types of information may be defined, in advance, by the specification. For example, the correspondence of the information type and the field is assigned (e.g., determined) by a synchronization signal block type definition, so that a standard synchronization signal block type is expected to have field values that are in conformance with the standard synchronization signal block type definition. That is, all of the fields of the standard synchronization signal block type are expected to have valid information according to the type of information associated with the field by the synchronization signal block type definition. The definition of the particular synchronization signal block type may be ascertained, for example, by reference to information such as Table 1.

The synchronization signal block generator 60B of FIG. 5B also generates one or more non-standard synchronization signal block types. In the non-standard synchronization signal block type only a subset of the fields include information in conformance with the standard synchronization signal block type. That is, the type of information included in one or more of the fields outside of the subset is not the type of information anticipated or expected in accordance with the standard synchronization signal block type definition. The fields outside of the subset thus cannot be decoded in the manner of the standard synchronization signal block type.

The wireless terminal of FIG. 5B receives and, using synchronization signal block type detector 70, decodes a synchronization signal block of a standard synchronization signal block type that comprises a predetermined number of fields which respectively correspond to a predetermined number of different types of information in conformance with the standard synchronization signal block type. Further, the wireless terminal of FIG. 5B also receives and (again using synchronization signal block type detector 70) decodes a non-standard synchronization signal block type wherein only a subset of the fields include information in conformance with the standard synchronization signal block type.

Figure 5C:
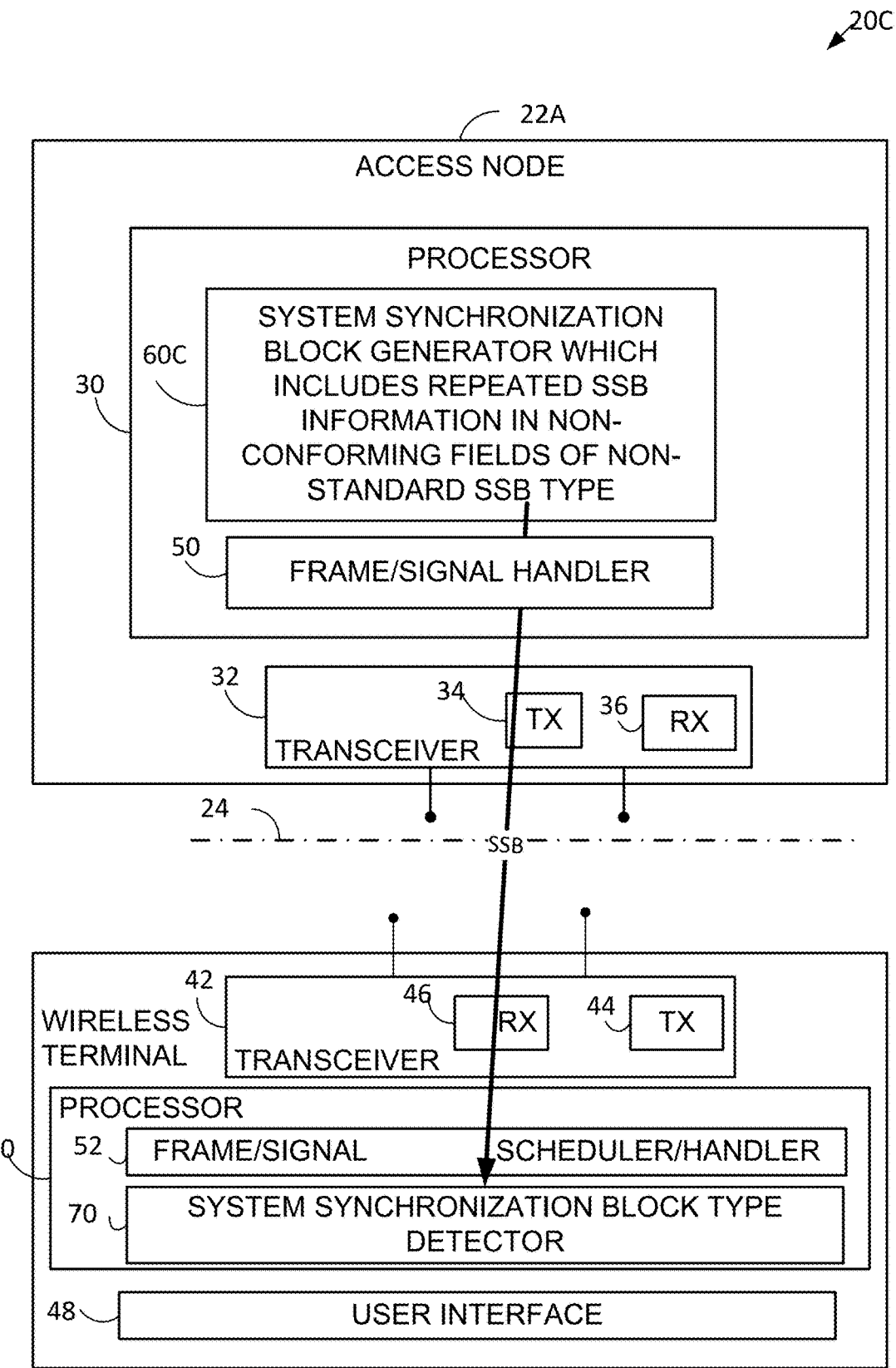
Figure 7C:
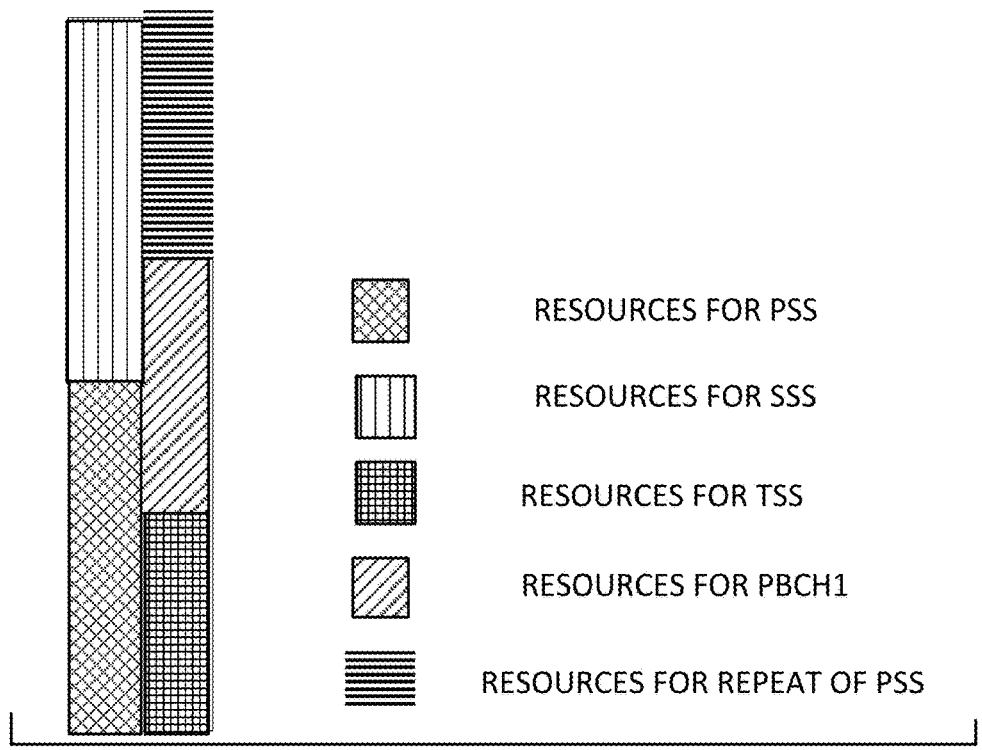
FIG. 7C is a diagrammatic view of a synchronization signal block of a non-standard synchronization signal block type in which a field that otherwise would be allocated to the PBCH2 essentially repeats PSS.

For a non-standard synchronization signal block type, the fields outside of the subset, i.e., the fields which do not include information in conformance with the standard synchronization signal block type and which cannot be decoded in the manner of the standard synchronization signal block type, may appear to be skipped or unused (e.g., the information is not transmitted) by the access node. In some example embodiments and modes such fields may in fact be un-used, or to contain null or empty or meaningless values. For example, the one or more fields of the type of the non-standard synchronization signal block may be assumed to be un-used (e.g., the information corresponding to the one or more fields is not transmitted). Also, the one or more fields of the type of the non-standard synchronization signal block may be assumed to contain null, empty or meaningless values (e.g., all "0" or all "1", for example). Namely, the one or more fields set to null, empty or meaningless values (e.g., all "0" or all "1", for example) may be contained in the type of the non-standard synchronization signal block. But in other example embodiments and modes, such fields of the non-standard synchronization signal block type may in advantageously utilized, as explained below. For example, the one or more fields of the type of the non-standard synchronization signal block may be assumed to be utilized as one or more fields of other information (e.g., one or more fields of other information included in the type of the non-standard synchronization signal). For example, as described below, the one or more fields of the type of the non-standard synchronization signal block may be assumed to be utilized for a repetition(s) of one or more fields of other information In the example access node 22C of FIG. 5C, node processor 30 includes a synchronization signal block generator 60C that repeats certain SSB information, already included in another field of the synchronization signal block, in the apparently skipped fields of a non-standard synchronization signal block type. That is, the synchronization signal block generator 60C of FIG. 5C includes, in one or more fields which is/are outside of the subset of fields that conform to the standard synchronization signal block type, repeated information which comprises a repetition of information carried in a field of the subset. For example, if the synchronization signal block of FIG. 7A is considered as the standard synchronization signal block and the synchronization signal block of FIG. 7B is considered as a non-standard synchronization signal block type relative to the synchronization signal block of FIG. 7A, FIG. 7C shows that the synchronization signal block generator 60C of FIG. 5C has generated a non-standard synchronization signal block type to include, in the field that otherwise would be allocated to the PBCH2 (i.e., any information included in the type if the standard synchronization signal block), information that essentially repeats the PSS. Information other than PSS information may be repeated, since the repetition of PSS is provide only as an example. In some example embodiments and modes, the synchronization signal block may be defined to include some or all information of a transmission channel, such as PDSCH, PDCCH, and/or PRACH, so the in the FIG. 5C example embodiment and mode the repeated information may, in some instances, be information of a transmission channel.

Figure 5D:
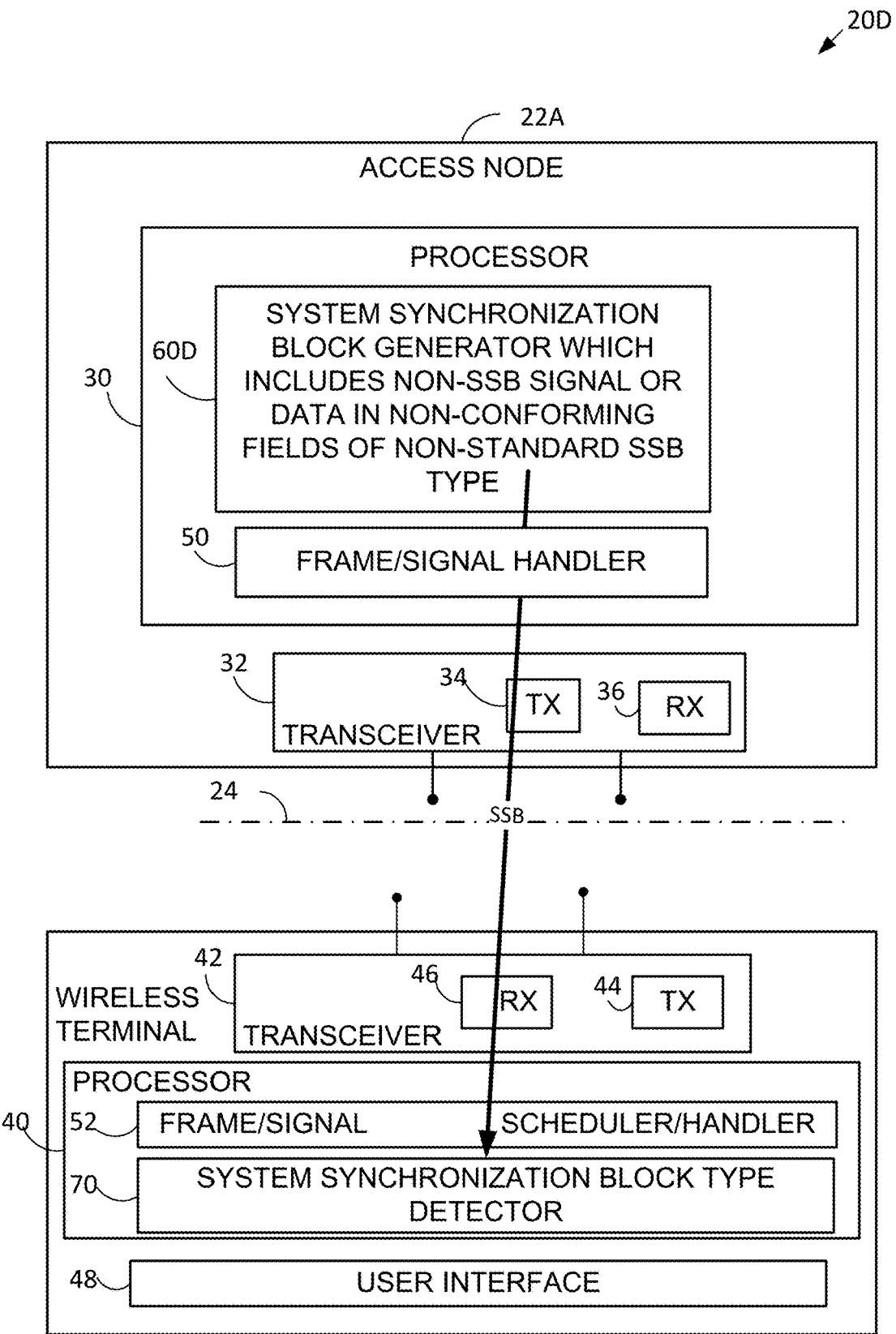
Figure 7D:
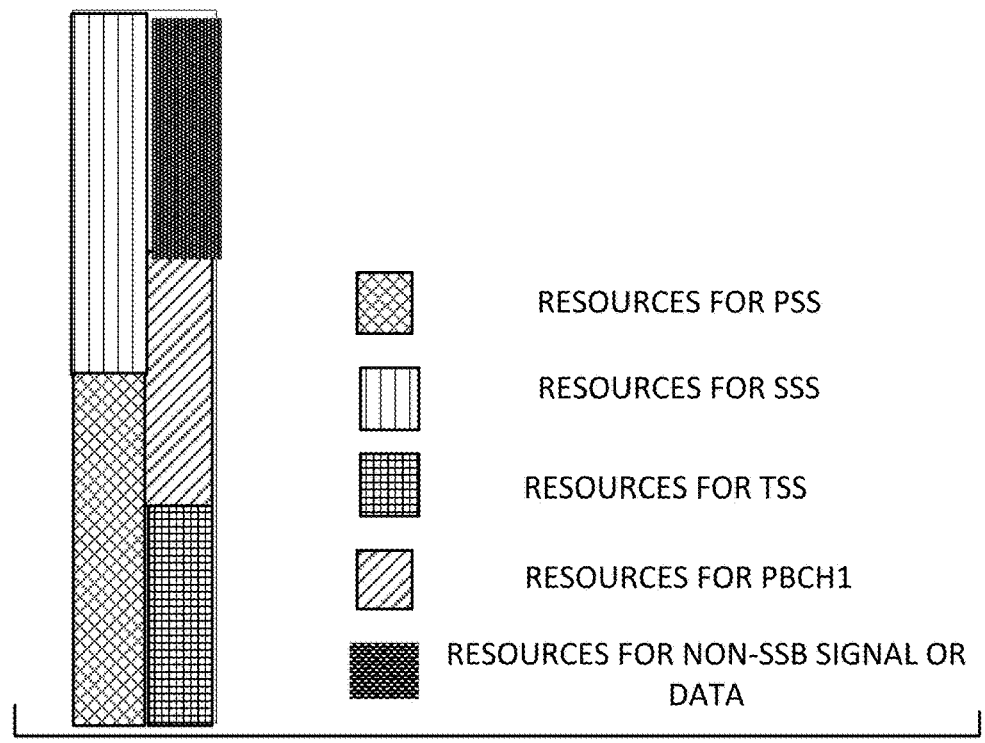
FIG. 7D is a diagrammatic view of a synchronization signal block of a non-standard synchronization signal block type in which a field that otherwise would be allocated to the PBCH2 instead bears non-SSB information.

In the example access node 22D of FIG. 5D, node processor 30 includes a synchronization signal block generator 60D that, in an apparently skipped one or more fields of a non-standard synchronization signal block type, instead includes a signal or data not otherwise included in a field of the standard synchronization signal block type. Thus the synchronization signal block generator 60D of FIG. 5D is shown as a generator that includes signal and/or data, not otherwise already included, in a synchronization signal block of a non-standard synchronization signal block type. For example, if the synchronization signal block of FIG. 7A is considered as the standard synchronization signal block and the synchronization signal block of FIG. 7B is considered as a non-standard synchronization signal block type relative to the synchronization signal block of FIG. 7A, FIG. 7D shows that the synchronization signal block generator 60D of FIG. 5D has generated a non-standard synchronization signal block type to include, in the field that otherwise would be allocated to the PBCH2, signal and/or data information that is not otherwise already included in the synchronization signal block.

As examples, the signal and/or data information that may be included by the synchronization signal block generator 60D of the access node of FIG. 6D into the non-conforming fields of the non-standard synchronization signal block type may comprise one or more of: (1) at least partial content of a Physical Downlink Control Channel (PDCCH); (2) at least partial content of a Physical Downlink Shared Channel (PDSCH); and (3) at least partial content of a Physical Random Access Channel (PRACH). For example, the one or more fields of the non-standard synchronization signal may be assumed to be utilized as one or more fields of PDCCH, PDSCH, and/or PRACH. For example, the one or more fields of the non-standard synchronization signal may be assumed to be utilized as one or more fields of PSS, SSS, TSS, PBCH, the first reference signals, and/or the second reference signals.

For the example embodiments and modes in which null or meaningless information (e.g., all "0" or all "1", for example) is included in the fields of a non-standard synchronization signal block type, the wireless terminal 26 does not obtain useful information from those fields. But in the situations in which meaningful information (repetitive SSB information in the case of FIG. 7C and non-SSB information in the case of FIG. 7D) is included in those fields, the synchronization signal block type detector 70 of the wireless terminal 26 is preconfigured to know the significance of those fields and to obtain meaningful information therefrom. For example, the resources used by skipped signal/channel/signaling/data in one SS block may be used by other signals/channels/signaling/data, e.g., in the format of repetition of other signals/channels/signaling/data (in the manner of FIG. 7C); or in the format of always being used by PDCCH, and/or PDSCH, and/or PRACH (i.e., other information) for transmission (in the manner of FIG. 7D). The wireless terminal 26 assumes one fixed predefined resource reuse format for each SS block structure type, thereby enabling the wireless terminal to obtain the further information from the non-standard synchronization signal block type.

In the foregoing it has been assumed that the standard synchronization signal block type is type 1 of Table 1, and that an example of a non-standard synchronization signal block type is type 2 of Table 2. It should be understood, however, that such choices are merely for sake of example, and that the standard synchronization signal block type may be other than type 1 of Table 1, and the non-standard synchronization signal block type may be other than type 2. In this latter regard, the "non-conforming field" that is outside of the subset of fields that conform to the standard synchronization signal block type may be other than the PBCH2. For example, Type 2 of Table 1 could be chosen as the standard synchronization signal block type and type 3 could be chosen as a non-standard synchronization signal block type, with the result that the field of the non-standard synchronization signal block type that corresponds to the TSS field may either be null or (as in the case of FIG. 7C) filled with repeating SSB information, or (as in the case of FIG. 7D) be filled with non-SSB signaling and/or data information.

Figure 5E:
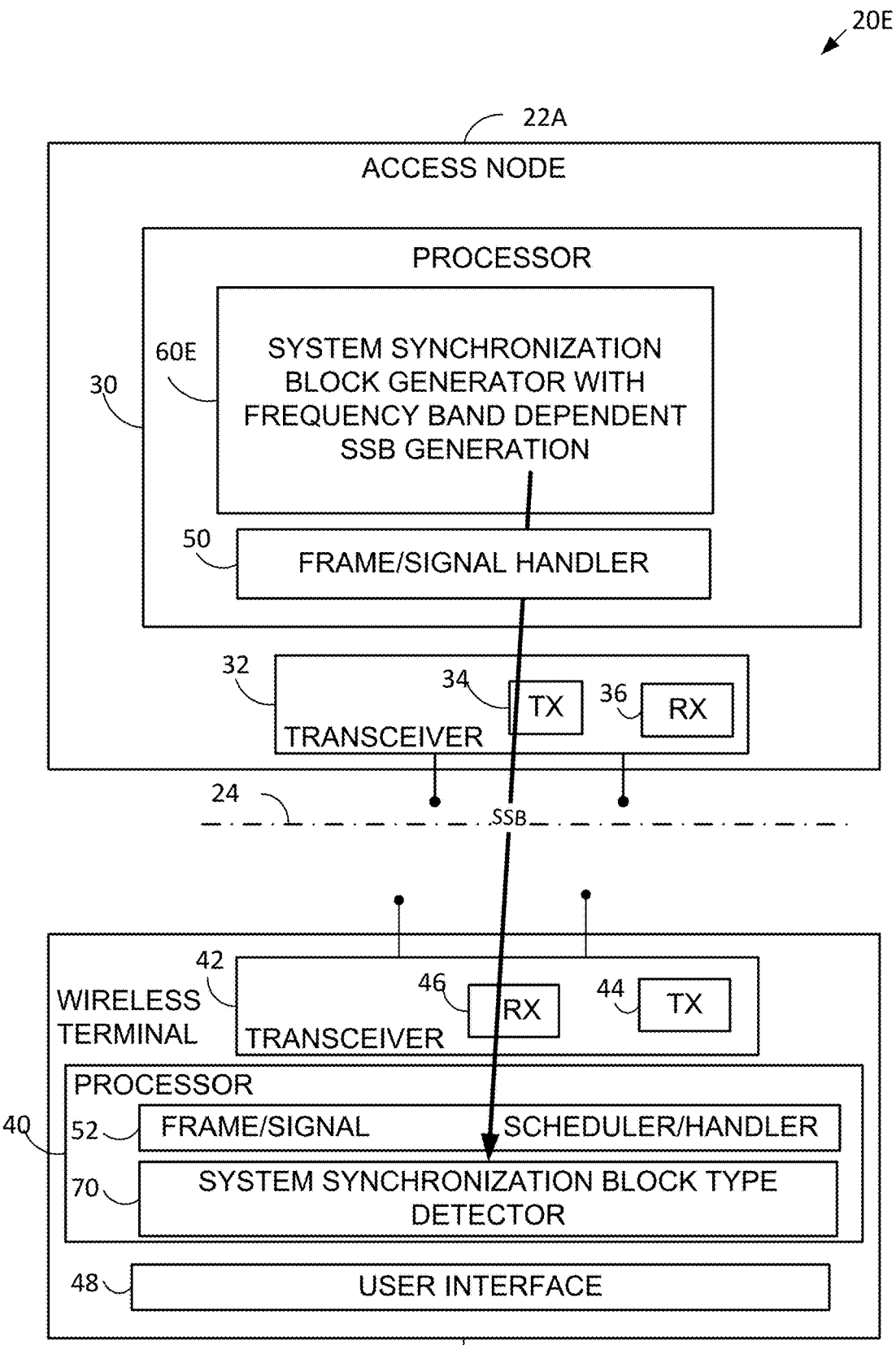

Further to the foregoing, in some example embodiments and modes the synchronization signal block generator may process different frequency bands differently in terms of generation and transmission of the plural types of synchronization signal blocks. For example, FIG. 5E shows an access node 22E in which the synchronization signal block generator 60E generates different synchronization signal block schemes for different frequency bands, each synchronization signal block scheme having a different set of differing synchronization signal block types.

Figure 11:
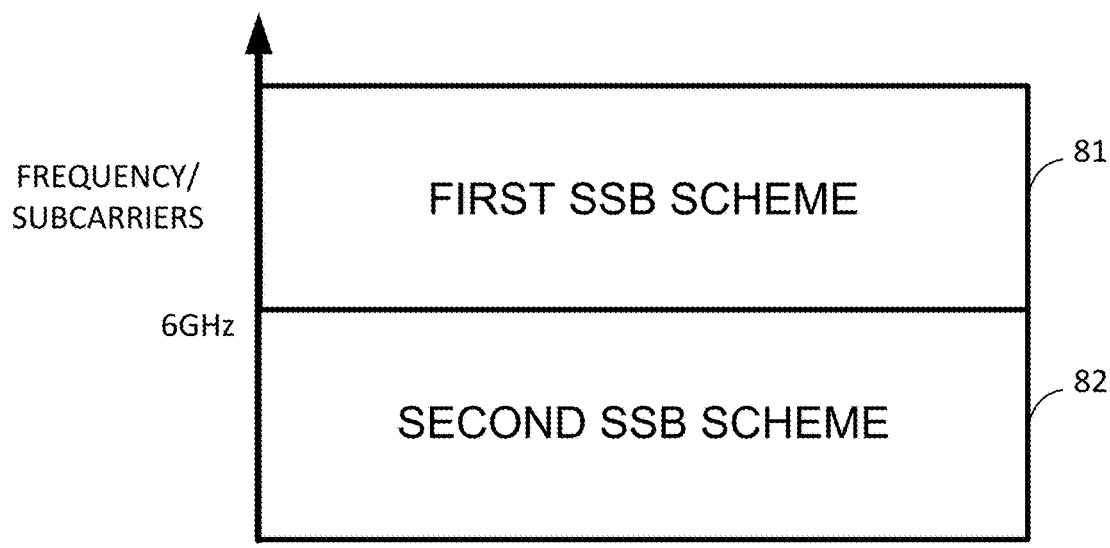
FIG. 11 is a diagrammatic view showing of different schemes for generating plural synchronization signal block types for differing frequency bands.

For example, as shown in FIG. 11, synchronization signal block generator 60E of access node 22E may generate a first set of differing synchronization signal block types in a first frequency band, according to first SSB scheme 81, and also generate a second set of synchronization signal block types, according to a second SSB scheme 82, for a second frequency band. By way of example, the first frequency band may be frequencies of 6 GHz and above, in which synchronization signal block generator 60E generate a first set of synchronization signal blocks to include synchronization signal block types 1, 2, and 4 (see Table 1). But for the second frequency band of below 6 GHz, the synchronization signal block generator 60E may generate a second set of synchronization signal block types to include synchronization signal block types 2, 3, and 4. In the first set, synchronization signal block type 1 may be the standard synchronization signal block, while in the second set the synchronization signal block type 2 may be the standard synchronization signal block. Table 2A and Table 2B illustrate the two different synchronization signal block schemes for different frequency bands.

TABLE 2

SSB TYPES INCLUDED IN SCHEME 1

| SSB Type | PSS | SSS | TSS | PBCH1 | PBCH2 |
|---|---|---|---|---|---|
| 1 | ♦ | ♦ | ♦ | ♦ | ♦ |
| 2 | ♦ | ♦ | ♦ | ♦ | |
| 4 | ♦ | ♦ | ♦ | | |

TABLE 3

SSB TYPES INCLUDED IN SCHEME 2

| SSB Type | PSS | SSS | TSS | PBCH1 | PBCH2 |
|---|---|---|---|---|---|
| 2 | ♦ | ♦ | ♦ | ♦ | |
| 3 | ♦ | ♦ | | ♦ | |
| 4 | ♦ | ♦ | ♦ | | |

The choices of SSB types for inclusion in the schemes of Table 2 and Table 3 are merely for sake of example, other scheme configurations are encompassed hereby. Moreover, for the frequency band differentiation of plural synchronization signal block types, it should be understood that the differentiation may occur with respect to more than two frequency bands and thus more than two schemes.

Figure 5F:
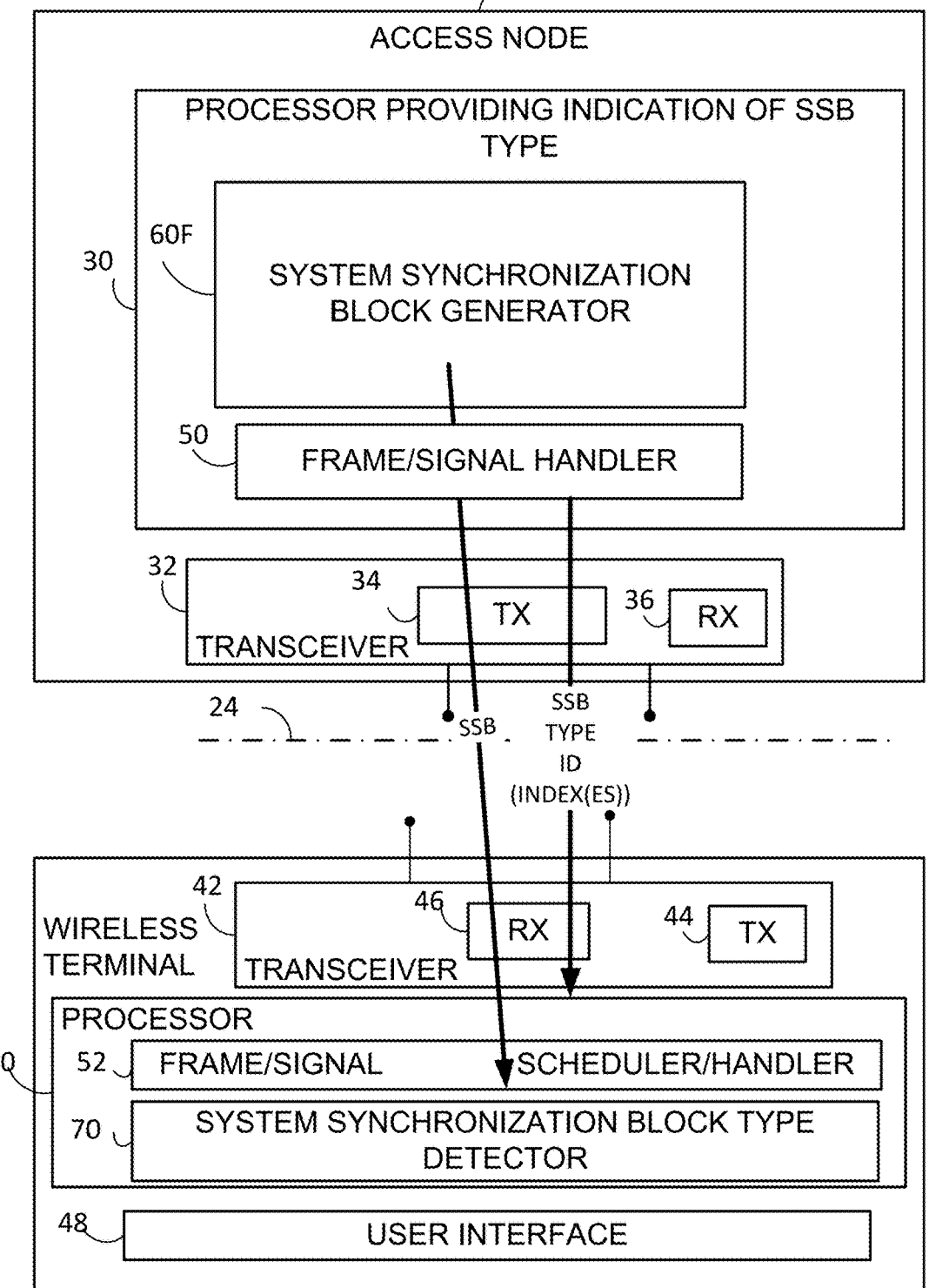

In some example embodiments and modes such as that of FIG. 5F, the access node may provide for each synchronization signal block an indication of its synchronization signal block type, and such indication of synchronization signal block type may be detectable by a receiving wireless terminal. In other example embodiments and modes, the access node may not provide explicit identification of synchronization signal block type, but may nevertheless intersperse synchronization signal blocks of differing synchronization signal block types in transmission to a wireless terminal. In such non-identified mode, the wireless terminal may initially assume that received synchronization signal blocks belong to a first or standard synchronization signal block type, but upon encountering a synchronization signal block that does not decode according to the standard synchronization signal block type, the wireless terminal may have to deduce or otherwise determine the contents of the received non-standard synchronization signal block.

Figure 3:
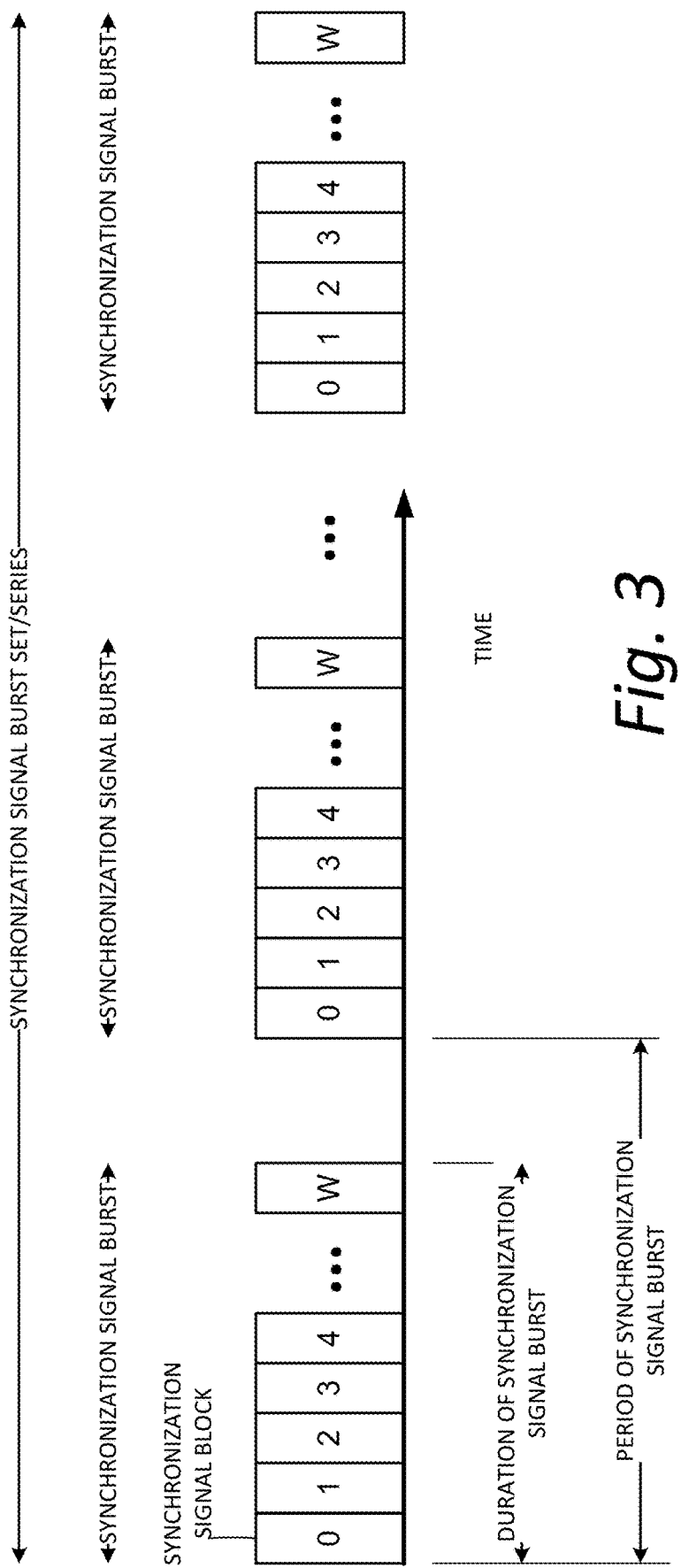
FIG. 3 is a diagrammatic view showing example NR SS block structure according to the RAN1 #86bis meeting.

FIG. 5F illustrates an example access node 22F which may, in accordance with differing example embodiments and modes, provide identification of synchronization signal block type (SSB TYPE ID) in various ways. For example, the node processor of the access node 22F may provide synchronization signal block type identification using an index, or a combination of two or more indexes, which is/are mapped to the synchronization signal block structure. A synchronization signal block type-indicating index may be of several types: synchronization signal block index; synchronization signal burst index; synchronization signal burst set index. The concepts of synchronization signal block, synchronization signal block burst, and synchronization signal block burst set are understood with reference to FIG. 3, for example. Thus, the indication of a synchronization signal block type may comprise one or more of a synchronization signal block index, a synchronization signal block burst index, and a synchronization signal block burst set index.

Figure 10A:
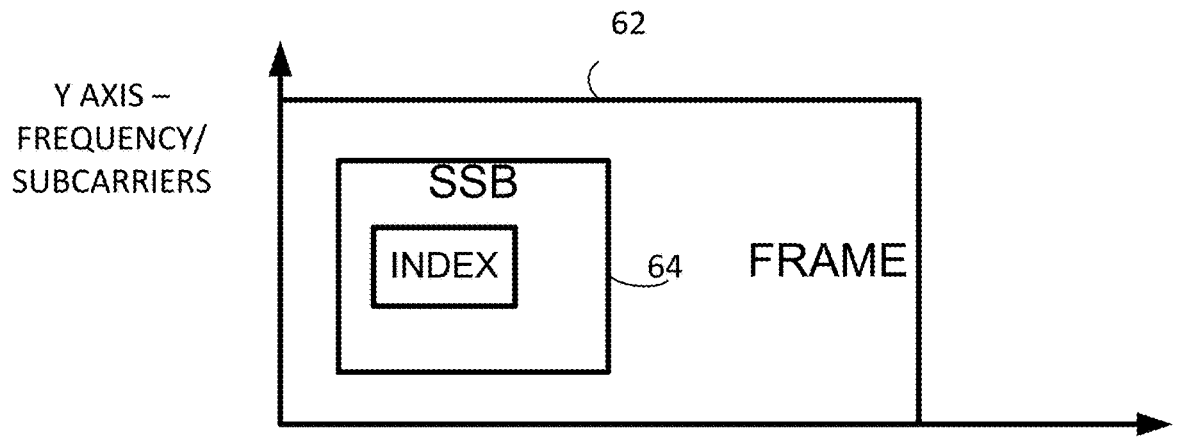
FIG. 10A-FIG. 10C are diagrammatic views showing use of either an explicit or implicit index for indicating synchronization signal block type.
Figure 10B:
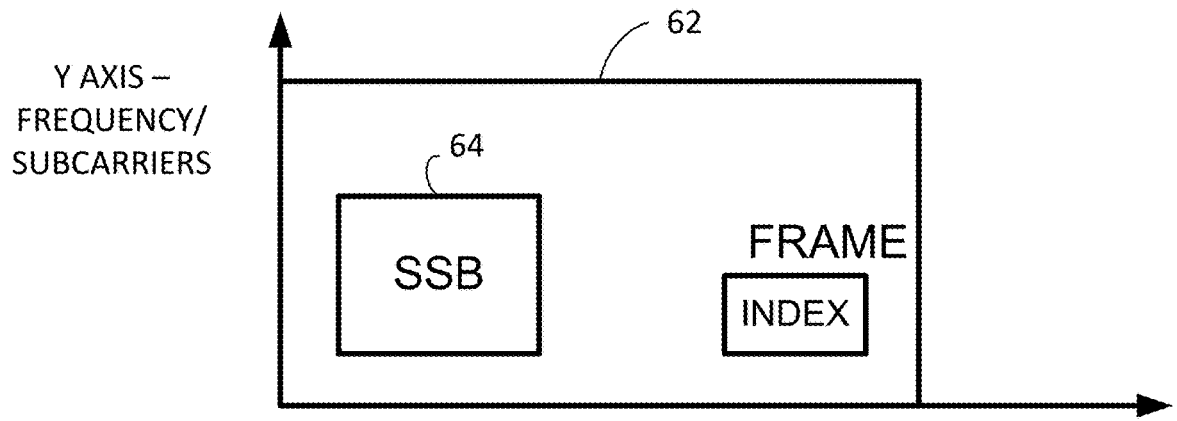

In some example embodiments and modes an "index" may be obtained from one symbol, from a combination of symbols, or any other information or pattern of information carried in a frame. The index(es) may be included in the synchronization signal block itself (as shown by way of example in FIG. 10A) or carried elsewhere in the frame (as shown by way of example in FIG. 10B). For example, the index(es) may be carried in the tertiary synchronization signal (TSS) of a synchronization signal block that includes a tertiary synchronization signal (TSS).

Figure 10C:
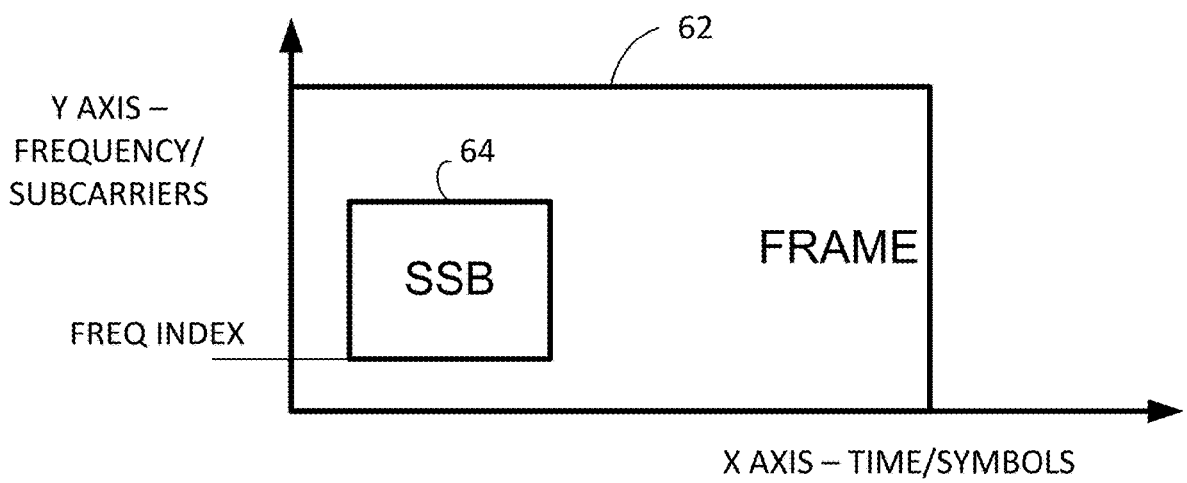

In some example embodiments and modes an "index" may refer to a time and/or frequency locator for the frame. For example, the wireless terminal may identify the type of the synchronization signal block (e.g., SSB TYPE ID) based on the index (e.g., a time index, and/or a frequency index) of the synchronization signal block, the index (indices) of the synchronization signal burst, and/or the index of the synchronization signal burst set. Namely, the index (indices) of the synchronization signal block, the synchronization signal burst, and/or the synchronization signal burst set may be used for the indication of the synchronization signal block type. See, for example, FIG. 10C which shows how an index indicative of SSB type may be related to frequency ("frequency index"). Frequency index is defined as the offset of the first subcarrier of SSB in frequency domain to some common frequency reference point.

In the above regard, for example, based on the index (indices) of the synchronization signal block, the synchronization signal burst, and/or the synchronization signal burst set, the wireless terminal may derive (identify, recognize), a symbol(s), and/or a slot index in a radio frame. For example, one index may be defined (e.g., indicated, configured) for every synchronization signal block within one synchronization signal burst, and/or one synchronization signal burst set. Also, one index that is specific to each synchronization signal block may be defined within one synchronization signal burst, and/or one synchronization signal burst set. Also, one index of synchronization signal burst that is specific to each synchronization signal burst may be defined within one synchronization signal burst set. Also, the index (indices) of synchronization signal burst, and/or synchronization signal burst set may be common across synchronization signal blocks in each synchronization signal burst, and/or each synchronization signal burst set.

Moreover, the index (indices) of the synchronization signal block may be indicated (identified, configured) by using PSS, SSS, TSS, and/or PBCH. For example, the index (indices) of the synchronization signal block may be implicitly, and/or explicitly indicated by using PBCH. Also, the wireless terminal may assume a synchronization signal block (e.g., a given synchronization signal block) is repeated with a periodicity of synchronization signal burst. Also, the wireless terminal may assume a synchronization signal block (e.g., a given synchronization signal block) is repeated with a periodicity of synchronization signal burst set. Here, the periodicity of synchronization signal burst, and/or the periodicity of synchronization signal burst set may be predefined with a default fixed value, or may be configured by the access node (e.g., the base station apparatus).

As a first example implementation of an index indication of synchronization signal block type, assume that an SS block index (i.e., the index of SS block) starts from zero (0). In such case, an SS block index=0 may indicate the first type of SS block structure (which may include complete set of synchronization signal block information or the "standard" synchronization signal block type discussed above); SS block index=1 may indicate a second type of SS block structure (which may include one subset of the information defined for the first type of SS block structure); SS block index=2 may indicate a third type of SS block structure (which may include another subset of the information defined for the first type of SS block structure); and so on so forth. Thus, the access node of FIG. 5F may generate and transmit a synchronization signal block index to indicate the synchronization signal block type of a synchronization signal block.

As a second example implementation of an index indication of synchronization signal block type, the access node 22F may provide a SS burst set index (i.e., the index of SS burst, and/or the index of SS burst set) which indicates the type of SS block structure. In providing the SS burst set index for this second example implementation, all SS blocks in a particular SS burst set share the same SS block structure. In other words, in this second example implementation, an index of a higher hierarchical layer (burst set) may subsume or encompass the bursts or synchronization signal blocks included in the higher layer. Thus, in accordance with this second example implementation, the access node may generate and transmit a synchronization signal burst index to indicate the synchronization signal block type of plural synchronization signal blocks belonging to a synchronization signal block burst, or may generate and transmit a synchronization signal burst set index to indicate the synchronization signal block type of plural synchronization signal blocks belonging to a set of synchronization signal block bursts.

As a third example implementation of an index indication of synchronization signal block type, a SS block odd index of SS burst set odd index indicates the first type of SS block structure, an SS block odd index of SS burst set even index indicates the second type of SS block structure, and so on so forth. Thus, it may also be that the use of two or more of the values of synchronization signal block index, synchronization signal block burst index, and synchronization signal block burst set index serve as indices to a two or more dimensional mapping to a particular synchronization signal block type value for a particular synchronization signal block. For example, a combination of two or more of a synchronization signal block index, a synchronization signal block burst index, and a synchronization signal block burst set index generated by the processor circuitry may be used to indicate the synchronization signal block type.

The example access node 22F of FIG. 5F may provide identification of synchronization signal block type (SSB TYPE ID) in yet other ways. For example, the access node may include an indication of synchronization signal block type in the SSB itself, e.g., in a PBCH or in the primary or secondary synchronization signal.

In some example embodiments and modes the access node is configured to generate the synchronization signal block in a manner in which its synchronization signal block type as ascertainable from a transmission parameter. For example, in the example access node 22G of FIG. 5G the synchronization signal block type is determined from a parameter known as the system frame number (SFN), e.g., the SFN of a frame in which the synchronization signal block is included. Namely, the synchronization signal block type may be determined based on the system frame number (SFN). As known in the art, the access node generates system frame numbers (SFN), which are typically expressed in a finite number of bits, e.g., ten bits. The finite number of bits means that the SFN numbers are re-used after the maximum SFN expressed by the finite number of bits is reached. For example, if the SFN has ten bits, then the SFNs are assigned as 0 through 1023, and thereafter repeated. So in the example embodiments and modes such as that typified by FIG. 5G that use SFN to identify synchronization signal block type, the access node 22G is configured to associate a given synchronization signal block type with one or more certain SFN values and to include that given synchronization signal block type in the frame(s) having the associated SFN value. Thus, the synchronization signal block generator 60G generates a particular synchronization signal block for inclusion in a system frame having a system frame number (SFN) that is associated with a synchronization signal block type for the particular synchronization signal block.

Figure 5G:
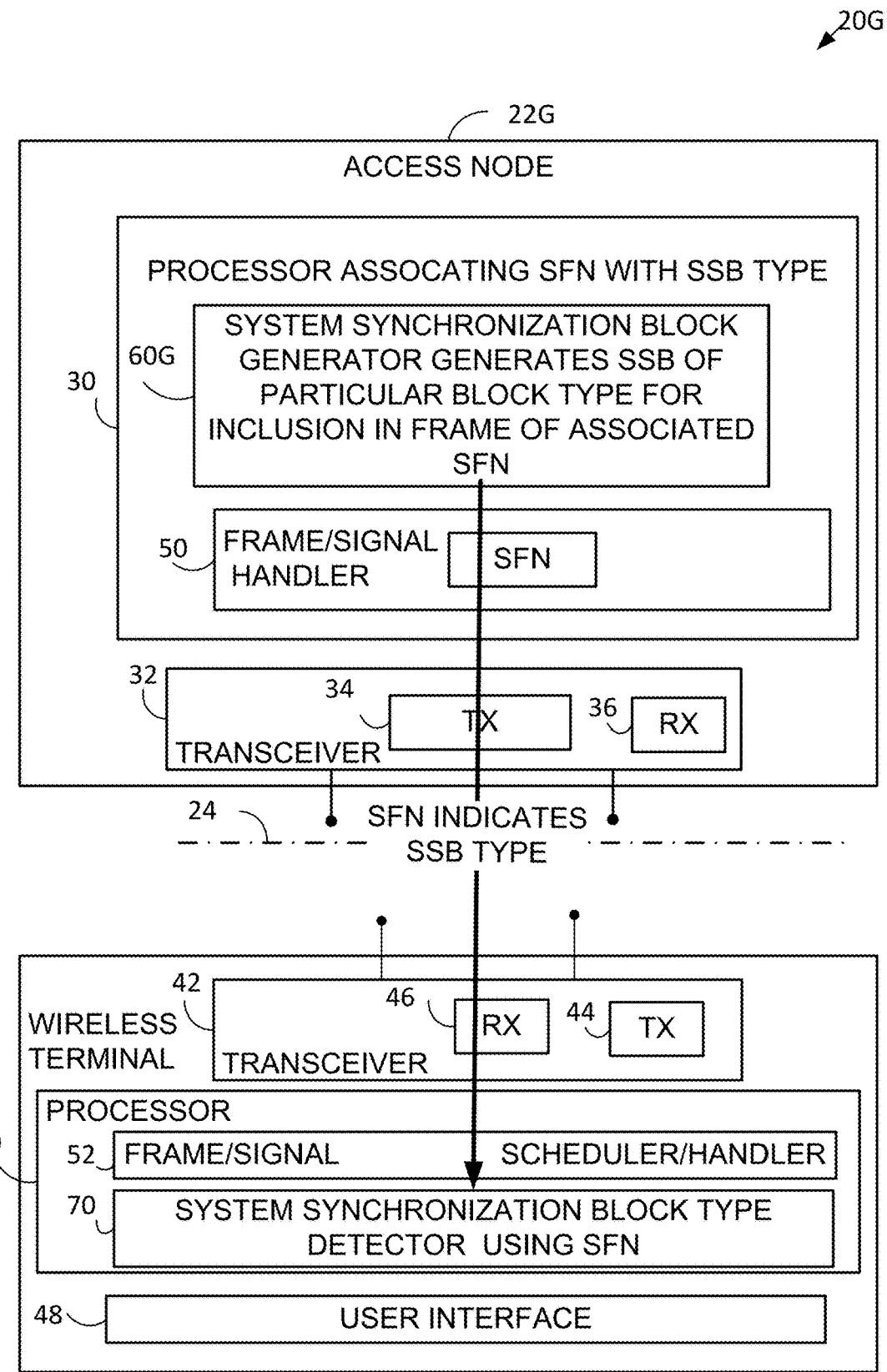

In the example of FIG. 5G the wireless terminal 26 obtains a synchronization signal block type indication for a particular synchronization signal block on a basis of a system frame number (SFN) of a system frame in which the particular synchronization signal block is transmitted. In particular, the wireless terminal 26 obtains a synchronization signal block type indication for a particular synchronization signal block on a basis of a system frame number (SFN) of a system frame in which the particular synchronization signal block is transmitted.

As an example of the foregoing, the wireless terminal 26 may identify different SS block structures through system frame numbers (SFN), which can be obtained from decoding PBCH, or at least partially from PBCH. For example, in some particular SFN, e.g., SFN=100, 220, 300 . . . , the SS block structure with multiplexed data transmission is used.

Figure 12:
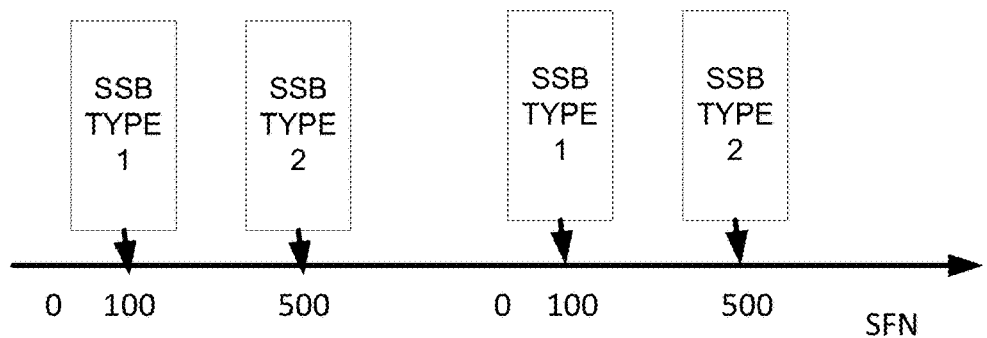
FIG. 12 is a diagrammatic view showing an association of synchronization signal block type with differing system frame numbers (SFN).

In the above regard, FIG. 12 shows an example scenario in which a first synchronization signal block type (e.g., standard synchronization signal block type) is associated with SFN=100, and a second synchronization signal block type (e.g., non-standard synchronization signal block type) is associated with SFN=500. When the wireless terminal 26 receives a synchronization signal block in a frame having SFN=100, the wireless terminal 26 will know that the received synchronization signal block is of the first synchronization signal block type. Alternatively, when the wireless terminal 26 receives a synchronization signal block in a frame having SFN=500, the wireless terminal 26 will know that the received synchronization signal block is of the second synchronization signal block type.

Other values of SFN may be associated with one or more synchronization signal block types. Moreover, a first synchronization signal block type may be associate with plural SFNs, e.g., SFN=100, SFN=200, . . . , SFN=400, and likewise the second synchronization signal block type may be associated with plural SFNs (e.g., SFN=500, SFN=600, etc . . . ).

As a variation of FIG. 5G, the access node 22G may use a combination of index-explicit identification and SFN value to identify the synchronization signal block type. For example, for some predefined SFN(s), the SS block index X with SS burst index Y and with SS burst index Z may indicate one particular type of SS block structure or synchronization signal block type. For another predefined SFN(s), the SS block index X with SS burst index Y and with SS burst index Z may indicate another particular type of SS block structure, e.g., another synchronization signal block type.

Described above are various ways in which the access node may provide an indication of the synchronization signal block type for a particular synchronization signal block. Among the ways above discussed are inclusion of one or more index(es) and generation of the synchronization signal block in association with a transmission parameter such as system frame number (SFN). In some example embodiments and modes, the access node may further be configured to transmit synchronization signal block type override information that supersedes the above indications (e.g., index or SFN association) of synchronization signal block type provided by the network. For example, when the wireless terminal 26 is in Radio Resource Control (RRC) connected mode/state, the structure of detected SS block (i.e., the synchronization signal block type) can be updated by dedicated RRC signaling, or broadcast signaling, for example. Then, after the wireless terminal 26 receives the updating signaling from network indicating its block structure, the indicated updating structure overrides the wireless terminal's assumption of SS block structure mapped from index and/or SFN information. On the other hand, when the wireless terminal 26 is in inactive state or when the wireless terminal 26 is in idle mode, the structure of detected SS block can be updated by broadcast signaling.

Figure 5H:
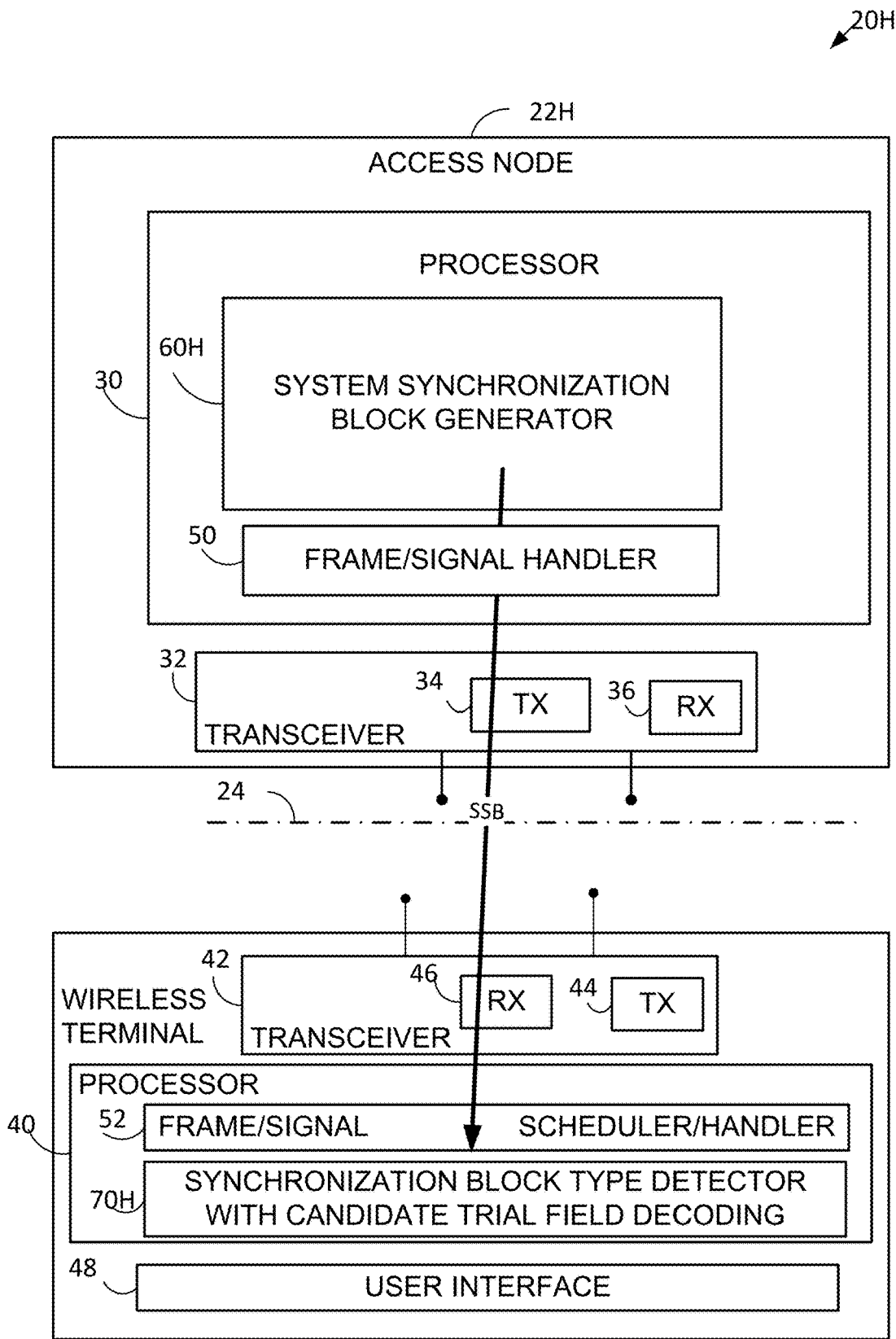

In example embodiments and modes such as many of those described above, the wireless terminal 26 may be configured essentially to be pre-alerted or previously warned to be on the outlook for synchronization signal blocks of differing synchronization signal block types, and indeed in many such example embodiments and modes the access node may provide the wireless terminal 26 with a mechanism for identifying the synchronization signal block type of a received synchronization signal block. But in other example embodiments and modes, such as that illustrated in FIG. 5H, the wireless terminal 26 may nominally or blindly suppose that all incoming or received synchronization signal blocks are to be of a particular synchronization signal block type (e.g., the standard synchronization signal block type), and in such case may have to react to receipt of a synchronization signal block of a non-standard synchronization signal block type. In FIG. 5H the terminal processor is shown as comprising synchronization signal block type detector with candidate trial field decoding 70H. The synchronization signal block type detector with candidate trial field decoding 70H has a list of candidate information elements for trial, the candidate could be the complete set or subset of information elements in the standard SSB.

Thus, as indicated above, in some example embodiments and modes, the access node may not provide explicit identification of synchronization signal block type, but may nevertheless intersperse synchronization signal blocks of differing synchronization signal block type in transmission to a wireless terminal. In such non-identified mode, the wireless terminal may initially assume that received synchronization signal blocks belong to a first or standard synchronization signal block type. But upon encountering a synchronization signal block that does not decode according to the standard synchronization signal block type, the synchronization signal block type detector with field decoding 70 of the wireless terminal of FIG. 5H may have to deduce or otherwise determine the contents of the received non-standard synchronization signal block. For example, the synchronization signal block type detector with candidate trial field decoding 70H may initially process the received synchronization signal block as a standard synchronization signal block type, but upon encountering a field of the received synchronization signal block that does not decode according to the standard synchronization signal block type, the synchronization signal block type detector with candidate trial field decoding 70H may attempt to determine an appropriate information type for the encountered field.

If, for example, upon entering a new cell (e.g., for initial cell selection, and/or for an idle wireless terminal), the wireless terminal receives (assumes) a synchronization signal block that is of the standard synchronization signal block type, the synchronization signal block type detector with candidate trial field decoding 70H of the wireless terminal 26 can ascertain the structure of the synchronization signal block to obtain or confirm understanding of what resources of the synchronization signal block are allocated to the information carried by the primary synchronization signal block (e.g., the standard synchronization signal block type). Based on the example and guidance of such a first received synchronization signal block being a standard synchronization signal block, the wireless terminal can intelligently attempt to similarly decode further synchronization signal blocks received over the air interface. As such, the wireless terminal preliminarily assumes that the wireless terminal knows what type of information will be allocated to each partition or segment (e.g., field) of the synchronization signal block, and accordingly engages an appropriate decoder/detector for each segment or partition. But should the wireless terminal encounter a field of the received synchronization signal block that does not decode with the type of decoder that the wireless terminal believed to be appropriate for that field, e.g., according to the CRC check of PBCH decoding, the negative result is shown in the field believed to be PBCH, then the wireless terminal will realize that the received synchronization signal block is a non-standard synchronization signal block type. Upon such realization of receipt of a non-standard synchronization signal block type, the synchronization signal block type detector with candidate trial field decoding 70H may use a trial and error approach to decode the non-conforming field, through confirmation with some criteria, e.g., CRC check. To this end, the wireless terminal 26 includes logic for sequentially implementing different decoders/detectors according to possible different synchronization signal block field types, e.g. types of synchronization signal block information, until the wireless terminal is successful in decoding/detecting the non-conforming field.

On the other hand, if upon entering a new cell, the wireless terminal receives (assumes) a synchronization signal block that is not of the primary synchronization signal block type (e.g., the standard synchronization signal block type), the wireless terminal may engage decoders of different types, on a trial and error basis, in an attempt to deconstruct the received synchronization signal block. Namely, the wireless terminal receives (assumes) a synchronization signal block that is any of the non-standard synchronization signal block type.

In some example embodiments and modes the synchronization signal block type detector with candidate trial field decoding 70H may attempt to successfully decode/detect every field of a received synchronization signal block in order to consider the synchronization signal block as being fully processed. That is, the synchronization signal block type detector with candidate trial field decoding 70H blindly decodes/detects the fields of the synchronization signal block until correct information is obtained from each field of the synchronization signal block.

In other example embodiments and modes, less than full recovery of the synchronization signal block may be useful or advantageous, particularly if the wireless terminal 26 was expecting a synchronization signal block to be of standard synchronization signal block type but discovers that the received synchronization signal block is not of the standard synchronization signal block type. In example embodiments and modes having less than full recovery of a synchronization signal block, the information/fields included in a synchronization signal block may be divided into at least two classes or categories: (1) a first class (which may be, for example) essential synchronization signal information and (2) a second class (which may be, for example, non-essential synchronization signal information. In example embodiments and modes in which the first class comprises essential synchronization signal information, such essential synchronization information may comprise, for example, any one, or any combination of synchronization signal information elements which are generally included in standard synchronization signal blocks, such as example PSS/SSS. In example embodiments and modes in which the first class comprises non-essential synchronization signal information, such essential synchronization information may include fields of the synchronization signal block other than the fields of the essential synchronization signal information. In the example embodiments and modes having which less than full recovery of a synchronization signal block, the synchronization signal block type detector with candidate trial field decoding 70H may, upon encountering a non-standard synchronization signal block type, perform modified search/decoding logic.

The modified search/decoding logic may be advantageous to help save time and energy during SS block detection. For example, if in each SS block there is both first class information (e.g., essential information) and second class information (e.g., non-essential information), it may take a long time and considerable energy to do blind decoding to recover fields of the block that are non-conforming to the standard synchronization signal block type. Moreover, the SS block information may be repeated (like in LTE, PSS/SSS is repeated every 5 ms, while PBCH is repeated every 40 ms). Therefore, if the wireless terminal can always get essential information from each SS block, then whether the wireless terminal 26 needs to get non-essential information from each SS block may not be an issue.

An example of modified search/decoding logic is to search only search only one candidate in each field, e.g., search only one candidate which is believed to be the appropriate one in that field in standard SSB. If such one search fails, the synchronization signal block type detector with candidate trial field decoding 70H thereafter just obtains the essential information from the synchronization signal block, and may later attempt to obtain correct non-essential information from another SS block. Alternatively, as another example of modified search/decoding logic, the wireless terminal 26 may decide that, after recovering the first class (e.g., essential SSB information), it may not be worth attempting to recover the second class information (e.g., the non-essential information) from this particular synchronization signal block, and thereby save energy that otherwise would be expended in a trial and error search for candidates for the field that does not conform to the standard synchronization signal block type.

Thus, in an example implementation that employs the modified search/decoding logic, the upon encountering the field of the received synchronization signal block that does not decode according to the standard synchronization signal block type, the synchronization signal block type detector with candidate trial field decoding 70H may try one candidate for the field and, if the one candidate is not successful for the field, may use only synchronization signal information that otherwise is recoverable from the non-standard synchronization signal block.

In an example embodiment and mode, in processing a series of synchronization signal blocks the wireless terminal may use a combination of index indication of synchronization signal block type (to determine the synchronization signal block type of some of the synchronization signal blocks of the series) and the wireless terminal's own decoding to determine the synchronization signal block types of other synchronization signal blocks of the series. For example, the synchronization signal block type detector 70 may start to process one or more synchronization signal blocks of a series of synchronization signal blocks using the indication of synchronization signal block type as provided by the access node, but thereafter may switch over to using its synchronization signal block type detector with candidate trial field decoding 70H, as described above.

Use of Beam ID to Determine Synchronization Signal Block Time Index

Figure 13:
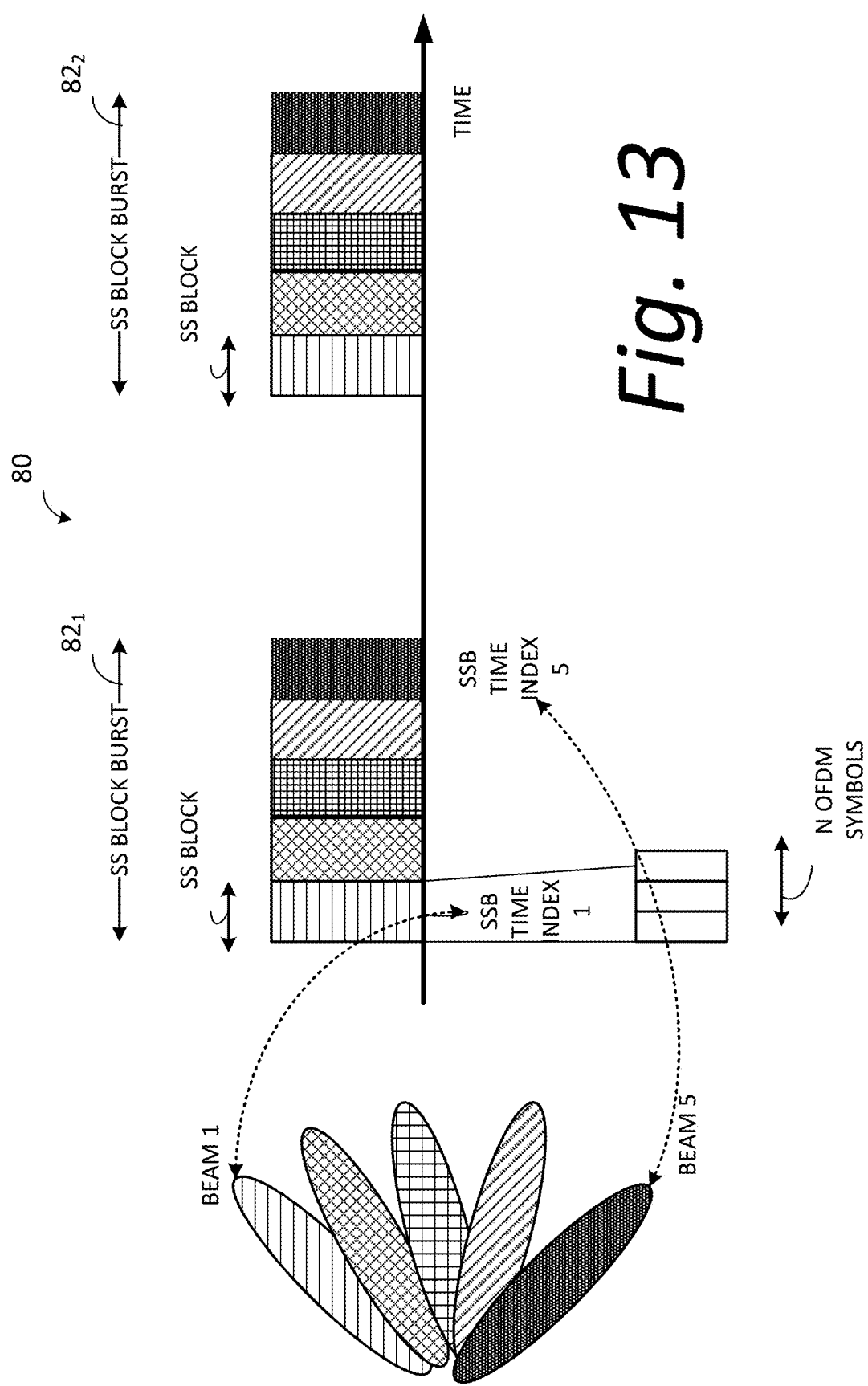
FIG. 13 is a diagrammatic view showing a synchronization signal block burst set comprising synchronization signal block bursts, as well as a relationship between beam identifiers and synchronization signal block time indexes.

In another example embodiment and mode, the synchronization signal blocks generated by the access node 22 are beam-based. FIG. 13 shows synchronization signal block burst set 80, comprising synchronization signal block bursts $82_1$ and $82_2$. Each synchronization signal block burst 82 comprises plural synchronization signal blocks, each of the synchronization signal blocks having a different synchronization signal block time index. Each of the synchronization signal blocks, and thus each of the synchronization signal block time indexes associated with the respective synchronization signal blocks, is paired or associated with a unique one of plural beams transmitted by the access node.

Figure 5I:
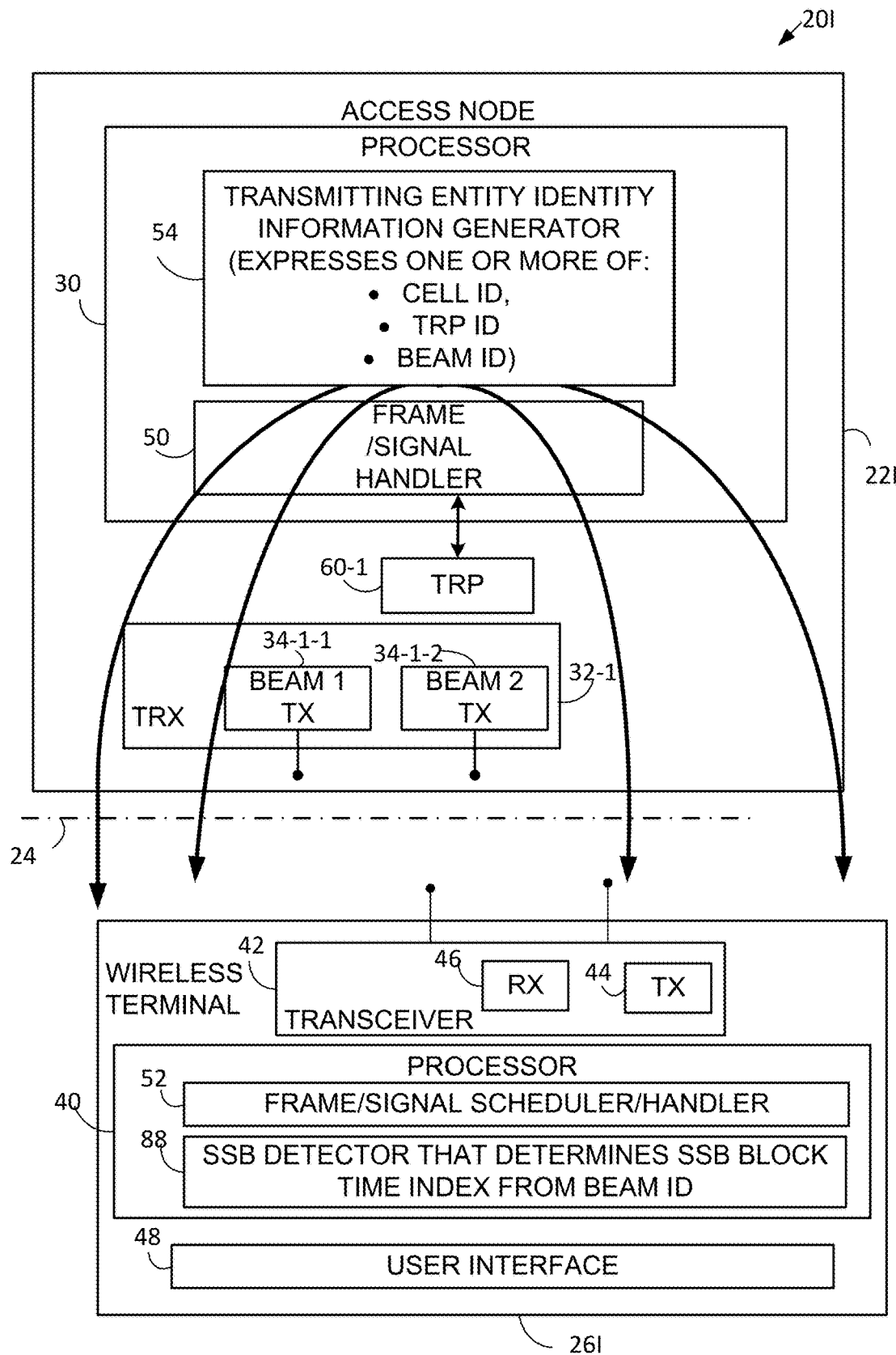
FIG. 5I is a schematic view showing an example communications system wherein a wireless terminal obtains a beam identifier (BID) and uses the beam identifier (BID) to obtain a synchronization signal block time index.

FIG. 5I shows access node 22F as comprising a system information (SI) generator 54 which generates an identity that expresses, e.g., beam ID (beam identifier (BID)). FIG. 5I further shows that the terminal processor 40 of wireless terminal 26I comprises a synchronization signal block detector 88 that determines a synchronization signal block time index from the beam ID that is received from the access node 26I.

Figure 14:
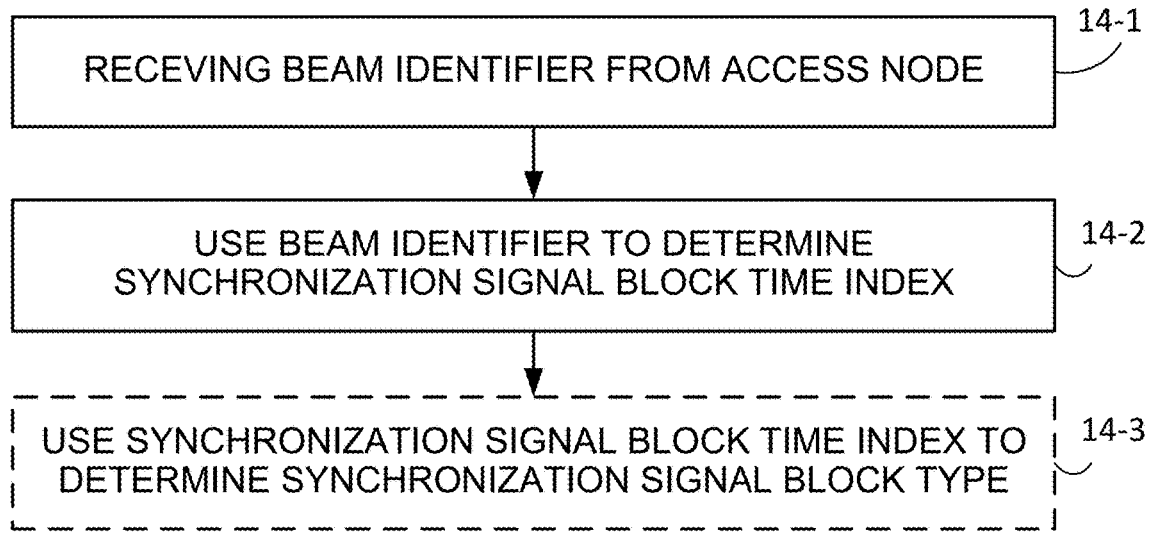
FIG. 14 is a flowchart showing example, basic acts or steps performed by a synchronization signal block detector that determines synchronization signal block time index from a beam identifier.

FIG. 14 shows example, basic acts or steps performed by the wireless terminal 26I of FIG. 5I. Act 14-1 comprises the wireless terminal receiving a beam identifier (BID) over radio interface 24 from access node 22F. The beam ID (beam identifier (BID) may be obtained in any of the manners described in U.S. provisional Patent application 62/453,986, filed Feb. 2, 2017, entitled "SYNCHRONIZATION SIGNAL TRANSMISSION AND RECEPTION FOR RADIO SYSTEM", which is incorporated herein by reference in its entirety. After the wireless terminal 26I has determined the beam identifier (BID) by such techniques, as act 14-2 the synchronization signal block detector 88 uses the beam identifier (BID) to derive a synchronization signal block time index for a synchronization signal block that is associated with the beam identifier (BID). For example, the beam identifier (BID) may be equated to the synchronization signal block time index, or mathematically used to derive the synchronization signal block time index, or used as an index into a mapping table or the like to ascertain the synchronization signal block time index. Further, as optional act 14-3, the terminal processor 40 may use the synchronization signal block time index to determine a synchronization signal block type for a received synchronization signal block.

There may be two alternative example embodiments and modes for SS-block index. In a first example embodiment and mode, time index may be counted within one SS burst set (in which case, no SS burst concept is defined). In a second example embodiment and mode, the time index may be counted within SS burst. As used herein, beam identifier (BID) may be according to either of these alternative example embodiments and modes, e.g., beam ID allocation (from network side) is either per SS burst, or per SS burst set.

Figure 15:
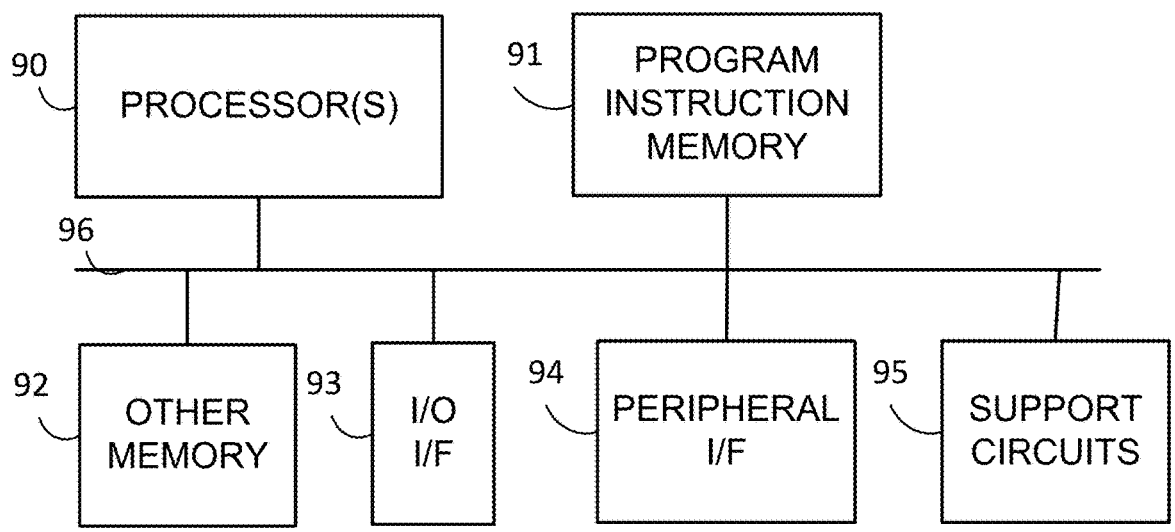
FIG. 15 is a diagrammatic view showing example electronic machinery which may comprise node electronic machinery or terminal electronic machinery.

Certain units and functionalities of node 22 and wireless terminal 26 are, in example embodiments, implemented by electronic machinery, computer, and/or circuitry. For example, the node processors 30 and terminal processors 40 of the example embodiments herein described and/or encompassed may be comprised by the computer circuitry of FIG. 15. FIG. 15 shows an example of such electronic machinery or circuitry, whether node or terminal, as comprising one or more processor(s) circuits 90, program instruction memory 91; other memory 92 (e.g., RAM, cache, etc.); input/output interfaces 93; peripheral interfaces 94; support circuits 95; and busses 96 for communication between the aforementioned units.

The program instruction memory 91 may comprise coded instructions which, when executed by the processor(s), perform acts including but not limited to those described herein. Thus is understood that each of node processor 30 and terminal processor 40, for example, comprise memory in which non-transient instructions are stored for execution.

In the above regard, the access node 22 of any of the example embodiments and modes described herein may comprise at least one processor (e.g., processor 30/90); at least one memory (e.g., memory 91) including computer program code, the memory and the computer program code configured to, working with the at least one processor, to cause the access node to perform the acts described herein, such as the acts of FIG. 8, for example. Similarly the wireless terminal 26 of any of the example embodiments and modes described herein may comprise at least one processor (e.g., processor 40/90); at least one memory (e.g., memory 91) including computer program code, the memory and the computer program code configured to, working with the at least one processor, to cause the wireless terminal 26 to perform the acts described herein, such as the acts of FIG. 9, for example.

The memory, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 95 may be coupled to the processors 90 for supporting the processor in a conventional manner. These circuits include cache, power supplies, clock circuits, input/output circuitry and subsystems, and the like.

To summarize and expound upon the foregoing, a SS block structure has been defined herein: the SS block may comprise synchronization signals (NR-PSS, and/or NR-SSS, and/or third synchronization signal (NR-TSS) indicating other information such as SS block index, and/or some other type of SS), and/or NR-PBCH (one NR-PBCH, or two NR-PBCHs including first physical broadcast channel and secondary physical broadcast channel), and/or reference signals (e.g., Measurement RS (NR-MRS), and/or reference signals for PBCH decoding, and/or some other type of RS), and/or signalling carried by NR-PDCCH, and/or data by NR-PDSCH and/or PRACH.

Further, the SS block may have fixed multiplexing structure for a given carrier frequency band. For different carrier frequency bands (One example is below 6 GHz and above 6 GHz. Of course, there could be more than the above two carrier frequency band categories; the separation point(s) to categorize different carrier frequency band could also be other frequency(ies)), SS block may have different fixed structure.

Moreover, the fixed structure of SS block means for a given frequency band, an SS block corresponds to N OFDM symbols based on the default subcarrier spacing, and N is a constant. Moreover, the signal (as mentioned above concerning SS block structure) multiplexing structure is fixed as well. In other words, within the time and frequency resources defined for an SS block, fixed time and frequency resources are allocated to corresponding signals/channels/signaling/data.

There are two alternative fixed multiplexing designs for SS block, referred to as Alt A and Alt B below.

For Alt A: There are M types SS block structures (where, M≥1) for a given carrier frequency band. Each type of SS blocks has the same fixed multiplexing structure.

Alt A.1: The UE identifies different SS block structure through index, e.g., SS block index, and/or SS burst index, and/or SS burst set index; in other words, any single one, or any combination of two, or the combination of three types of index (SS block index, SS burst index, and SS burst set index) is mapped to one SS block structure. The relationship could be any mapping from X index or index combinations to M (where, X≥1). (We might have a mapping figure here).

Example A.1.1: SS block index 0 (if SS block index starts from 0) indicates the first type of SS block structure (which may include complete set of information defined in paragraph 1); SS block index 1 indicates the second type of SS block structure (which may include one subset of the information defined for the first type of SS block structure. For example, the complete set of information consists of PSS/SSS, reference signals and PBCH; this type of SS block structure consists of PSS/SSS only); SS block index 2 indicates the third type of SS block structure (which may include another subset of the information defined for the first type of SS block structure); and so on so forth.

Example A.1.2: Similarly, SS burst set index indicates the type of SS block structure. It means all SS blocks in a particular SS burst set shares the same SS block structure.

Example A.1.3: SS block odd index of SS burst set odd index indicates the first type of SS block structure. SS block odd index of SS burst set even index indicates the second type of SS block structure. And so on so forth.

Alt A.2: The UE identifies different SS block structure through system frame number (SFN), which can be obtained from decoding PBCH, or at least partially from PBCH. For example, in some particular SFN, e.g., SFN=100, 200, 300 . . . , the SS block structure with multiplexed data transmission is used. Of course, here we use "100, 200, 300" as an example, they could be any other SFN numbers.

Alt A.3: Any combination of Alt A.1 and Alt A.2. For example, in some predefined SFN(s), the SS block index X with SS burst index Y with SS burst index Z indicates one particular type of SS block structure.

Alt A.4: Information carried by PBCH directly to indicate SS block structure

Alt A.5: Information carried by SS directly to indicate SS block structure

From UE's perspective, the UE assumes one fixed mapping relationship defined in above Alt A.1 to Alt A.3. Once the UE obtains the index and/or SFN information, the UE knows the structure of the SS block. Or the UE obtains SS block structure information from decoded PBCH information or detected SS information, as described in Alt A.4 and Alt A.5.

For the SS block structure without complete set of information (some information is skipped in the fixed multiplexing structure), there are two alternative designs, i.e., Alt A.X and Alt A.Y.

Alt A.X: The resources used by skipped signal/channel/signaling/data in one SS block are kept there without other use. So the UE doesn't get useful information from the reserved resources (The reserved resources are filled with all "0" or all "1").

Alt A.Y: As indicated in SLA 3707P, the resources used by skipped signal/channel/signaling/data in one SS block are used by other signals/channels/signaling/data, e.g., in the format of repetition of other signals/channels/signaling/data; or in the format of always being used by PDCCH, and/or PDSCH, and/or PRACH for transmission. The UE assumes one fixed predefined resource reuse format, as indicated in this paragraph, for each SS block structure type. So the UE can get further information from this SS block.

In case of Alt A.Y, when the UE is in RRC connected mode/state, the structure of detected SS block can be updated by dedicated RRC signaling, or broadcast signaling; for example, once the UE receives signaling from network indicating its block structure, the indicated structure overrides UE's assumption of SS block structure mapped from index and/or SFN information; on the other hand, when the UE is in inactive state or when the UE is in idle mode, the structure of detected SS block can also be updated by broadcast signaling.

Alt B: All SS blocks have the same fixed multiplexing structure for a given carrier frequency band. In this alternative, some information, which could be any one or more than one signals/channels/signaling/data defined in the first paragraph, can be skipped in some SS blocks. However, the UE doesn't know which information is skipped. UE always assumes the sole fixed multiplexing structure for SS block. For the SS block structure without complete set of information (some information is skipped in the fixed multiplexing structure), the two alternative designs Alt A.X and Alt A.Y are also applicable to Alt B. The UE blindly detects the SS block structure. In this design, the UE assumes periodicity of each signal/channel/signaling/data in the SS block, e.g., SS has periodicity of 5 ms; PBCH has periodicity of 40 ms; signaling is allowed to be transmitted in every 5 SS blocks; and data is allowed to be transmitted in every 10 SS blocks; then once the UE successfully blindly detects some information in some SS block, it knows in which SS blocks it detects the corresponding information again (in other words, it means the UE assumes different detection window including different number of SS blocks to detect different signal/channel/signaling/data). Of course, the periodicity mentioned in the example could be any other values, and the information to construct SS block could also be any from paragraph 1. If Alt A.X is adopted, the blind detection complexity is lower, as it's easy for the UE to detect the reserved bits (The values of reserved bits are known to the UE, either all "0" or all "1").

Similar as Alt A, the SS structure information can be updated by network signaling according to UE's state.

Further, Alt B can also be combined with Alt A. For example, the UE can detect the SS block structure with method indicated in Alt A, e.g., through SS block index information; then the UE can use Alt B to continue detecting signal/channel/signaling/data information in the following SS block, e.g., through assumption of signal/channel/signaling/data periodicity information.

The technology disclosed herein thus comprises and encompasses the following non-exhaustive example embodiments and modes:

Example Embodiment 1

An access node comprising:
processor circuitry configured to generate plural types of synchronization signal blocks for at least partially interspersed transmission over a radio interface, each synchronization signal block type comprising a unique combination of differing types of information;
transmitter circuitry configured to at least partially intersperse transmission of the plural types of synchronization signal blocks over the radio interface to at least one wireless terminal.

Example Embodiment 2

The access node of example embodiment 1, wherein the types of information that are carried in one or more types of synchronization signal block types comprises three or more of the following:
a primary synchronization signal (PSS),
a secondary synchronization signal (SSS),
a tertiary synchronization signals (TSS));
one or more physical broadcast channels (PBCH);
a reference signal;
a reference signal for PBCH decoding
signaling carried by a Physical Downlink Control Channel (PDCCH);
data carried by a Physical Downlink Shared Channel (PDSCH); and
data carried by a Physical Random Access Channel (PRACH).

Example Embodiment 3

The access node of example embodiment 1, wherein the processor circuitry is configured:
to generate a synchronization signal block of a standard synchronization signal block type that comprises a predetermined number of fields which respectively correspond to a predetermined number of different types of information in conformance with the standard synchronization signal block type; and
to generate a non-standard synchronization signal block type wherein only a subset of the fields include information in conformance with the standard synchronization signal block type.

Example Embodiment 4

The access node of example embodiment 3, wherein the processor circuitry is configured to include null information in fields of the non-standard synchronization signal block type which are outside of the subset.

Example Embodiment 5

The access node of example embodiment 3, wherein the processor circuitry is configured to include, in a field of the non-standard synchronization signal block type which is outside of the subset, repeated information which comprises a repetition of information carried in a field of the subset.

Example Embodiment 6

The access node of example embodiment 3, wherein the processor circuitry is configured to include, in a field of the non-standard synchronization signal block type which is outside of the subset, a signal or data not otherwise included in a field of the subset.

Example Embodiment 7

The access node of example embodiment 6, wherein the processor circuitry is configured to include, in the field of the non-standard synchronization signal block type which is outside of the subset, one or more of: (1) at least partial content of a Physical Downlink Control Channel (PDCCH); (2) at least partial content of a Physical Downlink Shared Channel (PDSCH); and (3) at least partial content of a Physical Random Access Channel (PRACH).

Example Embodiment 8

The access node of example embodiment 1, wherein the processor circuitry is configured to generate different synchronization signal block schemes for different frequency bands, each synchronization signal block scheme having a different set of differing synchronization signal block types.

Example Embodiment 9

The access node of example embodiment 8, wherein the processor circuitry is configured:
to generate a first set of differing synchronization signal block types in a first frequency band; and
to generate a second set of synchronization signal block types for a second frequency band.

Example Embodiment 10

The access node of example embodiment 1, wherein the processor circuitry is further configured to generate, for each synchronization signal block, an indication of its synchronization signal block type, such that the indication of synchronization signal block type is detectable by a receiving wireless terminal.

Example Embodiment 11

The access node of example embodiment 1, wherein the indication of its synchronization signal block type comprises one or more of a synchronization signal block index, a synchronization signal block burst index, and a synchronization signal block burst set index.

Example Embodiment 12

The access node of example embodiment 1, wherein a combination of two or more of a synchronization signal block index, a synchronization signal block burst index, and a synchronization signal block burst set index generated by the processor circuitry are used to indicate the synchronization signal block type.

Example Embodiment 13

The access node of example embodiment 10, wherein the indication of the synchronization signal block type is included in a Physical Broadcast Channel (PBCH).

Example Embodiment 14

The access node of example embodiment 10, wherein the indication of the synchronization signal block type is included in the synchronization signal block.

Example Embodiment 15

The access node of example embodiment 10, wherein the processor circuitry is further configured to transmit synchronization signal block type override information that supersedes another indication of synchronization signal block type provided by the access node.

Example Embodiment 16

The access node of example embodiment 1, wherein the processor circuitry is further configured to generate the synchronization signal block in a manner in which its synchronization signal block type as ascertainable from a transmission parameter.

Example Embodiment 17

The access node of example embodiment 16, wherein the processor circuitry is further configured to generate a particular synchronization signal block for inclusion in a system frame having a system frame number (SFN) that is associated with a synchronization signal block type for the particular synchronization signal block.

Example Embodiment 18

The access node of example embodiment 1, wherein the processor circuitry is further configured to generate the synchronization signal block in a manner in which its synchronization signal block type as ascertainable from a combination of a transmission parameter and an indicator generated and transmitted by the access node.

Example Embodiment 19

A method in an access node comprising:
using processor circuitry to generate plural types of synchronization signal blocks for at least partially interspersed transmission over a radio interface, each synchronization signal block type comprising a unique combination of differing types of information;
at least partially intersperse transmission of the plural types of synchronization signal blocks over the radio interface to at least one wireless terminal.

Example Embodiment 20

The method of example embodiment 19, further comprising:
using the processor circuitry to generate a synchronization signal block of a standard synchronization signal block type that comprises a predetermined number of fields which respectively correspond to a predetermined number of different types of information in conformance with the standard synchronization signal block type; and
using the processor circuitry to generate to generate a non-standard synchronization signal block type wherein only a subset of the fields include information in conformance with the standard synchronization signal block type.

Example Embodiment 21

A wireless terminal comprising:
receiver circuitry configured to receive, in at least partially interspersed manner, synchronization signal blocks of differing types over a radio interface from an access node, each synchronization signal block type comprising a unique combination of differing types of information;
processor circuitry configured determine to which of plural types of synchronization signal blocks a received synchronization signal block belongs.

Example Embodiment 22

The wireless terminal of example embodiment 21, wherein the types of information that are carried in one or more types of synchronization signal block types comprises three or more of the following:
a primary synchronization signal (PSS),
a secondary synchronization signal (SSS),
a tertiary synchronization signals (TSS));
one or more physical broadcast channels (PBCH);
a reference signal;
a reference signal for PBCH decoding
signaling carried by a Physical Downlink Control Channel (PDCCH);
data carried by a Physical Downlink Shared Channel (PDSCH); and
data carried by a Physical Random Access Channel (PRACH).

Example Embodiment 23

The wireless terminal of example embodiment 21, wherein the receiver circuitry is configured to receive:
a synchronization signal block of a standard synchronization signal block type that comprises a predetermined number of fields which respectively correspond to a predetermined number of different types of information in conformance with the standard synchronization signal block type; and
a non-standard synchronization signal block type wherein only a subset of the fields include information in conformance with the standard synchronization signal block type.

Example Embodiment 24

The wireless terminal of example embodiment 23, wherein the processor circuitry is configured to determine that null information exists in fields of the non-standard synchronization signal block type which are outside of the subset.

Example Embodiment 25

The wireless terminal of example embodiment 23, wherein the processor circuitry is configured to obtain, from a field of the non-standard synchronization signal block type which is outside of the subset, repeated information which comprises a repetition of information carried in a field of the subset.

Example Embodiment 26

The wireless terminal of example embodiment 23, wherein the processor circuitry is configured to obtain, from a field of the non-standard synchronization signal block type which is outside of the subset, a signal or data not otherwise included in a field of the subset.

Example Embodiment 27

The wireless terminal of example embodiment 26, wherein the processor circuitry is configured to obtain, from the field of the non-standard synchronization signal block type which is outside of the subset, one or more of: (1) at least partial content of a Physical Downlink Control Channel (PDCCH); (2) at least partial content of a Physical Downlink Shared Channel (PDSCH); and (3) at least partial content of a Physical Random Access Channel (PRACH).

Example Embodiment 28

The wireless terminal of example embodiment 21, wherein the receiver circuitry is configured to receive different synchronization signal block schemes for different frequency bands, each synchronization signal block scheme having a different set of differing synchronization signal block types.

Example Embodiment 29

The wireless terminal of example embodiment 28, wherein the processor circuitry is configured:
to obtain a first set of differing synchronization signal block types in a first frequency band; and
to obtain a second set of synchronization signal block types for a second frequency band.

Example Embodiment 30

The wireless terminal of example embodiment 21, wherein the processor circuitry is further configured to obtain from the access node, for each synchronization signal block, an indication of its synchronization signal block type.

Example Embodiment 31

The wireless terminal of example embodiment 21, wherein the indication of its synchronization signal block type comprises one or more of a synchronization signal block index, a synchronization signal block burst index, and a synchronization signal block burst set index.

Example Embodiment 32

The wireless terminal of example embodiment 21, wherein the processor circuitry is configured to use a combination of two or more of a synchronization signal block index, a synchronization signal block burst index, and a synchronization signal block burst set index to obtain the synchronization signal block type.

Example Embodiment 33

The wireless terminal of example embodiment 30, wherein the indication of the synchronization signal block type is obtained from a Physical Broadcast Channel (PBCH).

Example Embodiment 34

The wireless terminal of example embodiment 30, wherein the indication of the synchronization signal block type is obtained from the synchronization signal block.

Example Embodiment 35

The wireless terminal of example embodiment 30, wherein the receiver circuitry is further configured to receive synchronization signal block type override information that supersedes another indication of synchronization signal block type provided by the access node to the wireless terminal.

Example Embodiment 36

The wireless terminal of example embodiment 21, wherein the processor circuitry is further configured to obtain a synchronization signal block type indication for a particular synchronization signal block on a basis of a system frame number (SFN) of a system frame in which the particular synchronization signal block is transmitted.

Example Embodiment 37

The access node of example embodiment 21, wherein the processor circuitry is further configured to obtain an indication of the synchronization signal block type of a particular synchronization signal block based on a combination of an indicator generated and transmitted by the access node and a system frame number (SFN) of a system frame in which the particular synchronization signal block is transmitted.

Example Embodiment 38

The wireless terminal of example embodiment 21, wherein processor circuitry initially processes the received synchronization signal block as a standard synchronization signal block type, but upon encountering a field of the received synchronization signal block that does not decode according to the standard synchronization signal block type, attempts to determine an appropriate information type for the encountered field.

Example Embodiment 39

The wireless terminal of example embodiment 38, wherein upon encountering the field of the received synchronization signal block that does not decode according to the standard synchronization signal block type, the processor circuitry is configured to try one candidate for the field and, if the one candidate is not successful for the field, uses only synchronization signal information that otherwise is recoverable from the non-standard synchronization signal block.

Example Embodiment 40

The wireless terminal of example embodiment 21, wherein:
the receiver circuitry is further configured to receive a beam identifier over a radio interface from an access node;
the processor circuitry is configured to use the beam identifier to determine a synchronization signal block time index for a synchronization signal block that is associated with the beam identifier.

Example Embodiment 41

The wireless terminal of example embodiment 40, wherein the processor circuitry is configured to use the beam identifier in a mapping operation to ascertain the synchronization signal block time index.

Example Embodiment 42

A method in a wireless terminal comprising:
receiving, in at least partially interspersed manner, synchronization signal blocks of differing types over a radio interface from an access node, each synchronization signal block type comprising a unique combination of differing types of information;
using processor circuitry to determine to which of plural types of synchronization signal blocks a received synchronization signal block belongs.

Example Embodiment 43

The method of example embodiment 42, further comprising:
receiving and decoding a synchronization signal block of a standard synchronization signal block type that comprises a predetermined number of fields which respectively correspond to a predetermined number of different types of information in conformance with the standard synchronization signal block type; and
receiving and decoding a non-standard synchronization signal block type wherein only a subset of the fields include information in conformance with the standard synchronization signal block type.

Example Embodiment 44

The method of example embodiment 42, further comprising the processor circuitry initially processing the received synchronization signal block as a standard synchronization signal block type, but upon encountering a field of the received synchronization signal block that does not decode according to the standard synchronization signal block type, attempting to determine an appropriate information type for the encountered field.

Example Embodiment 45

The method of example embodiment 38, further comprising upon encountering the field of the received synchronization signal block that does not decode according to the standard synchronization signal block type, the processor circuitry trying one candidate for the field and, if the one candidate is not successful for the field, using only synchronization signal information that otherwise is recoverable from the non-standard synchronization signal block.

Example Embodiment 46

The method of example embodiment 21, further comprising:
receiving a beam identifier over a radio interface from an access node;
the processor circuitry using the beam identifier to determine a synchronization signal block time index for a synchronization signal block that is associated with the beam identifier (BID).

Example Embodiment 47

The method of example embodiment 46, further comprising the processor circuitry using the synchronization signal block time index to determine the synchronization signal block type for a received synchronization signal block.

Example Embodiment 48

A user equipment comprising:
receiving circuitry configured to receive, from a base station apparatus, a radio resource control signaling including information, the information being used for indicating whether a primary synchronization signal and a secondary synchronization signal and a physical broadcast channel and a reference signal for decoding the physical broadcast channel are transmitted in a block consisting of a constant number of OFDM symbols, wherein the receiving circuitry is configured to receive, based on the information, from the base station apparatus, the block in which the primary synchronization signal and the secondary synchronization signal and the physical broadcast channel and the reference signal for decoding the physical broadcast channel are transmitted,
the primary synchronization signal and the secondary synchronization signal are used for identifying a physical cell identity, and
the physical broadcast channel is used for carrying System Frame Number information.

Example Embodiment 49

The user equipment of Example Embodiment 48: further comprising processing circuitry configured to:
obtain the physical cell identity from the primary synchronization signal and the secondary synchronization signal;
obtain the System Frame Number information from the physical broadcast channel.

Example Embodiment 50

A base station apparatus comprising:
transmitting circuitry configured to transmit, to a user equipment, a radio resource control signaling including information, the information being used for indicating whether a primary synchronization signal and a secondary synchronization signal and a physical broadcast channel and a reference signal for decoding the physical broadcast channel are mapped to a block consisting of a constant number of OFDM symbols, wherein
the transmitting circuitry is configured to transmit, based on the information, to the user equipment, the block to which the primary synchronization signal and the secondary synchronization signal and the physical broadcast channel and the reference signal for decoding the physical broadcast channel are mapped, the primary synchronization signal and the secondary synchronization signal are used for identifying a physical cell identity, and the physical broadcast channel is used for carrying System Frame Number information.

Example Embodiment 50

The base station of Example Embodiment 50, further comprising processing circuitry configured to:

express the physical cell identity using the primary synchronization signal and the secondary synchronization signal;

express the System Frame Number information using the physical broadcast channel Example Embodiment 52

A communication method of a user equipment comprising:

receiving, from a base station apparatus, a radio resource control signaling including information, the information being used for indicating whether a primary synchronization signal and a secondary synchronization signal and a physical broadcast channel and a reference signal for decoding the physical broadcast channel are transmitted in a block consisting of a constant number of OFDM symbols, and receiving, based on the information, from the base station apparatus, the block in which the primary synchronization signal and the secondary synchronization signal and the physical broadcast channel and the reference signal for decoding the physical broadcast channel are transmitted, wherein the primary synchronization signal and the secondary synchronization signal are used for identifying a physical cell identity, and the physical broadcast channel is used for carrying System Frame Number information.

Example Embodiment 53

The method of Example Embodiment 52, further comprising using processing circuitry to:

obtain the physical cell identity from the primary synchronization signal and the secondary synchronization signal;

obtain the System Frame Number information from the physical broadcast channel.

Example Embodiment 54

A communication method of a base station apparatus comprising:

transmitting, to a user equipment, a radio resource control signaling including information, the information being used for indicating whether a primary synchronization signal and a secondary synchronization signal and a physical broadcast channel and a reference signal for decoding the physical broadcast channel are mapped to a block consisting of a constant number of OFDM symbols, and transmitting, based on the information, to the user equipment, the block to which the primary synchronization signal and the secondary synchronization signal and the physical broadcast channel and the reference signal for decoding the physical broadcast channel are mapped, wherein the primary synchronization signal and the secondary synchronization signal are used for identifying a physical cell identity, and the physical broadcast channel is used for carrying System Frame Number information.

Example Embodiment 55

The method of Example Embodiment 54, further comprising using processing circuitry to:

express the physical cell identity using the primary synchronization signal and the secondary synchronization signal;

express the System Frame Number information using the physical broadcast channel Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit (s) [ASIC], and/or field programmable gate array(s) (FPGA (s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A user equipment comprising:
   receiving circuitry configured to:
      receive, when the user equipment is in Radio Resource Control connected mode/state, and from a base station apparatus, a radio resource control signaling including an indication, the indication being used for identifying a synchronization signal block type of a synchronization signal block in which a primary synchronization signal, a secondary synchronization signal, a physical broadcast channel, and a reference signal for decoding the physical broadcast channel are transmitted, the synchronization signal block type being indicated by the indication, the synchronization signal block consisting of a constant number of OFDM symbols; and
      receive, from the base station apparatus, the synchronization signal block in which the primary synchronization signal, the secondary synchronization signal, the physical broadcast channel, and the reference signal for decoding the physical broadcast channel are transmitted; and
   processing circuitry configured to determine the synchronization signal block type based on the indication, wherein
   the processing circuitry is configured to:
      perform a time and frequency synchronization based on the primary synchronization signal and the secondary synchronization signal; and
      obtain System Frame Number information provided by the physical broadcast channel.

2. A base station apparatus comprising:
   transmitting circuitry configured to:
      transmit, when a user equipment is in Radio Resource Control connected mode/state, and to the user equipment, a radio resource control signaling including an indication, the indication being used for identifying a synchronization signal block type of a synchronization signal block to which a primary synchronization signal, a secondary synchronization signal, a physical broadcast channel, and a reference signal for decoding the physical broadcast channel are mapped, the synchronization signal block type being indicated by the indication, the synchronization signal block consisting of a constant number of OFDM symbols; and
      transmit, to the user equipment, the synchronization signal block to which the primary synchronization signal, the secondary synchronization signal, the physical broadcast channel, and the reference signal for decoding the physical broadcast channel are mapped, wherein
   the primary synchronization signal and the secondary synchronization signal are used for identifying a physical cell identity, and
   the physical broadcast channel is used for carrying System Frame Number information.

3. A communication method of a user equipment comprising:
   receiving, when the user equipment is in Radio Resource Control connected mode/state, and from a base station apparatus, a radio resource control signaling including an indication, the indication being used for identifying a synchronization signal block type of a synchronization signal block in which a primary synchronization signal, a secondary synchronization signal, a physical broadcast channel, and a reference signal for decoding the physical broadcast channel are transmitted, the synchronization signal block type being indicated by the indication, the synchronization signal block consisting of a constant number of OFDM symbols;
   receiving, from the base station apparatus, the synchronization signal block in which the primary synchronization signal, the secondary synchronization signal, the physical broadcast channel, and the reference signal for decoding the physical broadcast channel are transmitted;
   determining the synchronization signal block type based on the indication;

performing a time and frequency synchronization based on the primary synchronization signal and the secondary synchronization signal; and obtaining System Frame Number information provided by the physical broadcast channel.

4. A communication method of a base station apparatus comprising:

transmitting, when a user equipment is in Radio Resource Control connected mode/state, and to the user equipment, a radio resource control signaling including an indication, the indication being used for identifying a synchronization signal block type of a synchronization signal block to which a primary synchronization signal, a secondary synchronization signal, a physical broadcast channel, and a reference signal for decoding the physical broadcast channel are mapped, the synchronization signal block type being indicated by the indication, the synchronization signal block consisting of a constant number of OFDM symbols; and transmitting, to the user equipment, the synchronization signal block to which the primary synchronization signal, the secondary synchronization signal, the physical broadcast channel, and the reference signal for decoding the physical broadcast channel, are mapped, wherein the primary synchronization signal and the secondary synchronization signal are used for identifying a physical cell identity, and the physical broadcast channel is used for carrying System Frame Number information.

5. The user equipment according to claim 1, wherein the indication indicates to which of all synchronization signal block types the synchronization signal block belongs, and synchronization signal blocks of the all synchronization signal block types have a same number of resources.

6. The base station apparatus according to claim 2, wherein the indication indicates to which of all synchronization signal block types the synchronization signal block belongs, and synchronization signal blocks of the all synchronization signal block types have a same number of resources.

7. The communication method according to claim 3, wherein the indication indicates to which of all synchronization signal block types the synchronization signal block belongs, and synchronization signal blocks of the all synchronization signal block types have a same number of resources.

8. The communication method according to claim 4, wherein the indication indicates to which of all synchronization signal block types the synchronization signal block belongs, and synchronization signal blocks of the all synchronization signal block types have a same number of resources.

\* \* \* \* \*